United States Patent [19]
Katta

[11] Patent Number: 6,094,455
[45] Date of Patent: Jul. 25, 2000

[54] IMAGE COMPRESSION/ENCODING APPARATUS AND SYSTEM WITH QUANTIZATION WIDTH CONTROL BASED ON BIT GENERATION ERROR

[75] Inventor: Noboru Katta, Itami, Japan

[73] Assignee: Matsushita Electric Industrial Co., Ltd., Osaka, Japan

[21] Appl. No.: 08/936,855

[22] Filed: Sep. 24, 1997

[30] Foreign Application Priority Data

Sep. 25, 1996 [JP] Japan .................................. 8-252591

[51] Int. Cl.[7] ...................................................... H04N 7/26
[52] U.S. Cl. ............................ 375/240; 348/405; 348/419
[58] Field of Search .................................... 348/405, 419, 348/384, 390; 382/251; 375/240

[56] References Cited

U.S. PATENT DOCUMENTS

| | | | |
|---|---|---|---|
| 5,231,484 | 7/1993 | Gonzales et al. | 348/405 |
| 5,283,646 | 2/1994 | Bruder | 348/415 |
| 5,389,973 | 2/1995 | Kitamura | 348/405 |
| 5,592,226 | 1/1997 | Lee | 348/407 |
| 5,612,900 | 3/1997 | Azadegan | 709/247 |
| 5,686,963 | 11/1997 | Uz | 348/405 |
| 5,758,092 | 5/1998 | Agarwal | 348/515 |

FOREIGN PATENT DOCUMENTS

| | | |
|---|---|---|
| 4255190 | 9/1992 | Japan . |
| 7107479 | 4/1995 | Japan . |
| 7322254 | 12/1995 | Japan . |
| 9-18874 | 1/1997 | Japan . |

*Primary Examiner*—Bryan Tung
*Attorney, Agent, or Firm*—Renner, Otto, Boisselle & Sklar LLP

[57] ABSTRACT

According to the present invention, an image compression/encoding apparatus for determining a quantization width by which a video signal is encoded so as to encode the video signal based on the quantization width is provided. The apparatus includes control means for determining an actual bit generation number which has been consumed for encoding the video signal, determining a target bit generation number in accordance with a target bit rate, determining a bit generation error as a difference between the actual bit generation number and the target bit generation number, determining a quantization width with respect to the bit generation error, setting a characteristic in a predetermined range of the bit generation error where the quantization width varies slightly with respect to the bit generation error, and determining the quantization width with respect to the bit generation error based on the characteristic.

14 Claims, 14 Drawing Sheets

IMAGE COMPRESSION/ENCODING APPARATUS AND SYSTEM WITH QUANTIZATION WIDTH CONTROL BASED ON BIT GENERATION ERROR

BACKGROUND OF THE INVENTION

1. Field of the Invention

The present invention relates to an image compression/encoding apparatus and an image compression/encoding method for compressing and encoding a video signal. More particularly, the present invention relates to how to control a quantization width by which the video signal is encoded, how to control a bit generation number, and the like.

2. Description of the Related Art

There are known techniques for compressing/encoding a video signal such as the international standard format of digitally compressed/encoded data described in ISO/IEC 13818-2 (commonly known as "MPEG2"), in which the decoding method therefor is also described. Moreover, a typical example of a method for encoding a video signal into this format is described in "Test Model 3" of ISO-IEC/JTC/SC29/WG11 NO328.

According to the MPEG2 encoding, a video signal is processed by compensation and estimation of motions between pictures and by the DCT (discrete cosine transform) encoding of estimation errors. When quantizing the transform coefficients of the DCT, the bit generation number varies (e.g., increases/decreases) depending upon the quantization width. In order to compress the video signal into a desired amount of data, the quantization width is controlled in accordance with the bit generation number consumed for the encoding process so as to adjust the data amount. "Test Model 3" of ISO-IEC/JTC/SC29/WG11 NO328 describes a method for determining the quantization width for the video signal such that the video signal can be reproduced by inputting the encoded image data to a decoding apparatus at a desired and fixed bit rate.

"Test Model 3" calculates a target bit number from a target bit rate for each GOP (Group Of Pictures) including a plurality of pictures, assigns the target bit number to each of the I, P and B pictures of the GOP, and encodes these pictures. Herein, an I picture is a picture created at the beginning of each GOP; a P picture is a picture which is created for every certain number of pictures; and a B picture is a picture which is created between the I picture and the P picture.

This method determines the target bit generation number for the current GOP through some adjustment based on the bit generation number consumed for encoding a past GOP, and assigns the target bit generation number to the pictures of the current GOP. Therefore, when the proportion of the information amount between the I, P and B pictures is considerably different from that of the past GOP, the number of bits to be assigned to the I, P and B pictures may be inappropriate. The proportion of the information amount between the I, P and B pictures often shows a two-fold or greater change under an ordinary situation. If there is a scene change, even a B picture may require a number of bits which would normally be required by an I picture. Moreover, if there is a scene with a more complicated image, the amount of information itself may increase ten-fold. In such cases, the number of bits to be assigned to the picture becomes insufficient, whereby the quality of the reproduced image for the picture may be deteriorated significantly.

Moreover, since the bit generation number is controlled for each GOP, when a scene change, or the like, occurs near the end of a GOP (i.e., in the last several pictures of the GOP), for example, the number of bits to be assigned will be insufficient by a long shot. In such a case, the degree of difficulty of encoding the picture sharply increases, whereby the quality of the reproduced image for the picture will deteriorate significantly.

The method performs an adjustment such that the actual bit generation number is as close to the target bit generation number as possible by calculating the target bit generation number and controlling the quantization width of the video signal based on a comparison between the target bit generation number and the actual bit generation number, while assuming that the number of bits to be consumed for encoding each of the macroblocks included in one picture is constant throughout the picture.

However, the amount of information may vary significantly depending upon the relative position of a video image in a picture with respect to the background of the picture, whereby the bit assignment in that picture cannot be performed satisfactorily. For example, when a complicated pattern, or the like, exists in a macroblock in the latter part of the picture, most of the bits are assigned and consumed in the simple first part of the picture, thereby resulting in an unexpectedly large bit generation number in the latter part. Conversely, when the first part has a complicated pattern, the bit generation number is suppressed more than necessary in the first part, and a bit generation number more than necessary is assigned in the latter part. Thus, no bit may be available to be assigned in the part of the picture where some bits are required to be assigned.

Moreover, although this method is a control method which adjusts the actual bit generation number to the target bit generation number, it does not consider the fullness of the VBV buffer (virtual buffer) virtually provided in the decoding apparatus. Therefore, it is necessary to modify the bit distribution for the pictures by using a constraint from the VBV buffer. This has led to further deterioration in the quality of the reproduced image.

In order to prevent the quality of the reproduced image from being unstable and deteriorating owing to such a variation in the degree of difficulty of encoding a video signal, it is necessary to maintain the quantization width for the video signal as constant as possible. However, when the quantization width is fixed, the bit generation number increases according simply to the degree of difficulty of encoding images, whereby it is difficult to encode a video signal at the target bit rate.

SUMMARY OF THE INVENTION

According to one aspect of this invention, an image compression/encoding apparatus for determining a quantization width by which a video signal is encoded so as to encode the video signal based on the quantization width is provided. The apparatus includes control means for determining an actual bit generation number which has been consumed for encoding the video signal, determining a target bit generation number in accordance with a target bit rate, determining a bit generation error as a difference between the actual bit generation number and the target bit generation number, determining a quantization width with respect to the bit generation error, setting a characteristic in a predetermined range of the bit generation error where the quantization width varies slightly with respect to the bit generation error, and determining the quantization width with respect to the bit generation error based on the characteristic.

In one embodiment of the invention, a standard quantization width is predetermined; and the control means determines a ratio between a value obtained by subtracting from the target bit rate a value which corresponds to the bit generation error and the target bit rate, multiplies the ratio with the standard quantization width to give a product, and determines a quantization width, by which a video signal is encoded, based on the product.

In another embodiment of the invention, the control means determines a standard quantization width based on the target bit rate, sets a characteristic in a predetermined range of the bit generation error where the quantization width varies slightly with respect to a variation of the bit generation error in the vicinity of the standard quantization width, and determines the quantization width with respect to the bit generation error based on the characteristic.

In still another embodiment of the invention, the characteristic of the variation of the quantization width with respect to the variation of the bit generation error defines a hysteresis loop in and in a vicinity of a predetermined range of the bit generation error.

In still another embodiment of the invention, when a virtual buffer is virtually provided for sequentially receiving image data obtained by encoding a video signal and sequentially outputting the image data, a fullness of the virtual buffer corresponds to the bit generation error; and when the fullness of the virtual to buffer approaches zero, the quantization width rapidly approaches a maximum value thereof while the quantization width varies continuously so as to be successive from the characteristic where the quantization width varies slightly with respect to the variation of the bit generation error.

In still another embodiment of the invention, a plurality of ranges of the bit generation error are predetermined, with a characteristic which indicates a variation of the quantization width with respect to the variation of the bit generation error being set for each of the ranges; and the control means selects one of the ranges in which a bit generation error exists so as to determine the quantization width with respect to the bit generation error based on the characteristic of the selected range.

In still another embodiment of the invention, the apparatus is in conformity with the MPEG standard and encodes a video signal by macroblocks based on the quantization width; and the control means determines a quantization width with respect to the bit generation error for each macroblock.

According to another aspect of this invention, an image compression/encoding method for determining a quantization width by which a video signal is encoded so as to encode the video signal based on the quantization width is provided. The method includes the steps of: determining an actual bit generation number which has been consumed for encoding the video signal; determining a target bit generation number in accordance with a target bit rate; determining a bit generation error as a difference between the actual bit generation number and the target bit generation number; determining a quantization width with respect to the bit generation error; setting a characteristic in a predetermined range of the bit generation error where the quantization width varies slightly with respect to the bit generation error; and determining the quantization width with respect to the bit generation error based on the characteristic.

In one embodiment of the invention, a standard quantization width is predetermined; a ratio between a value obtained by subtracting from the target bit rate a value which corresponds to the bit generation error and the target bit rate is determined; the ratio is multiplied with the standard quantization width to give a product; and a quantization width, by which a video signal is encoded, is determined based on the product.

In another embodiment of the invention, a standard quantization width is determined based on the target bit rate; a characteristic is set in a predetermined range of the bit generation error where the quantization width varies slightly with respect to a variation of the bit generation error in the vicinity of the standard quantization width; and the quantization width with respect to the bit generation error is determined based on the characteristic.

In still another embodiment of the invention, the characteristic of the variation of the quantization width with respect to the variation of the bit generation error defines a hysteresis loop in and in a vicinity of a predetermined range of the bit generation error.

In still another embodiment of the invention, when a virtual buffer is virtually provided for sequentially receiving image data obtained by encoding a video signal and sequentially outputting the image data, a fullness of the virtual buffer corresponds to the bit generation error; and when the fullness of the virtual buffer approaches zero, the quantization width rapidly approaches a maximum value thereof while the quantization width varies continuously so as to be successive from the characteristic where the quantization width varies slightly with respect to the variation of the bit generation error.

In still another embodiment of the invention, a plurality of ranges of the bit generation error are predetermined; a characteristic the characteristic which indicates a variation of the quantization width with respect to the variation of the bit generation error is set for each of the ranges; and one of the ranges is selected in which a bit generation error exists so as to determine the quantization width with respect to the bit generation error based on the characteristic of the selected range.

In still another embodiment of the invention, the method is in conformity with the MPEG standard and encodes a video signal by macroblocks based on the quantization width; and a quantization width with respect to the bit generation error is determined for each macroblock.

Thus, the invention described herein makes possible the advantages of (1) providing an image compression/encoding apparatus capable of always assigning a suitable number of bits even for a picture containing a scene change, or for a complicated picture, assigning an optimal number of bits for each of the macroblocks in a picture in accordance with the complexity of the macroblock, and thus encoding the picture at a target bit rate while stably maintaining the quality of reproduced images; and (2) providing a method for performing such an image compression/encoding.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying figures.

Figure 1:
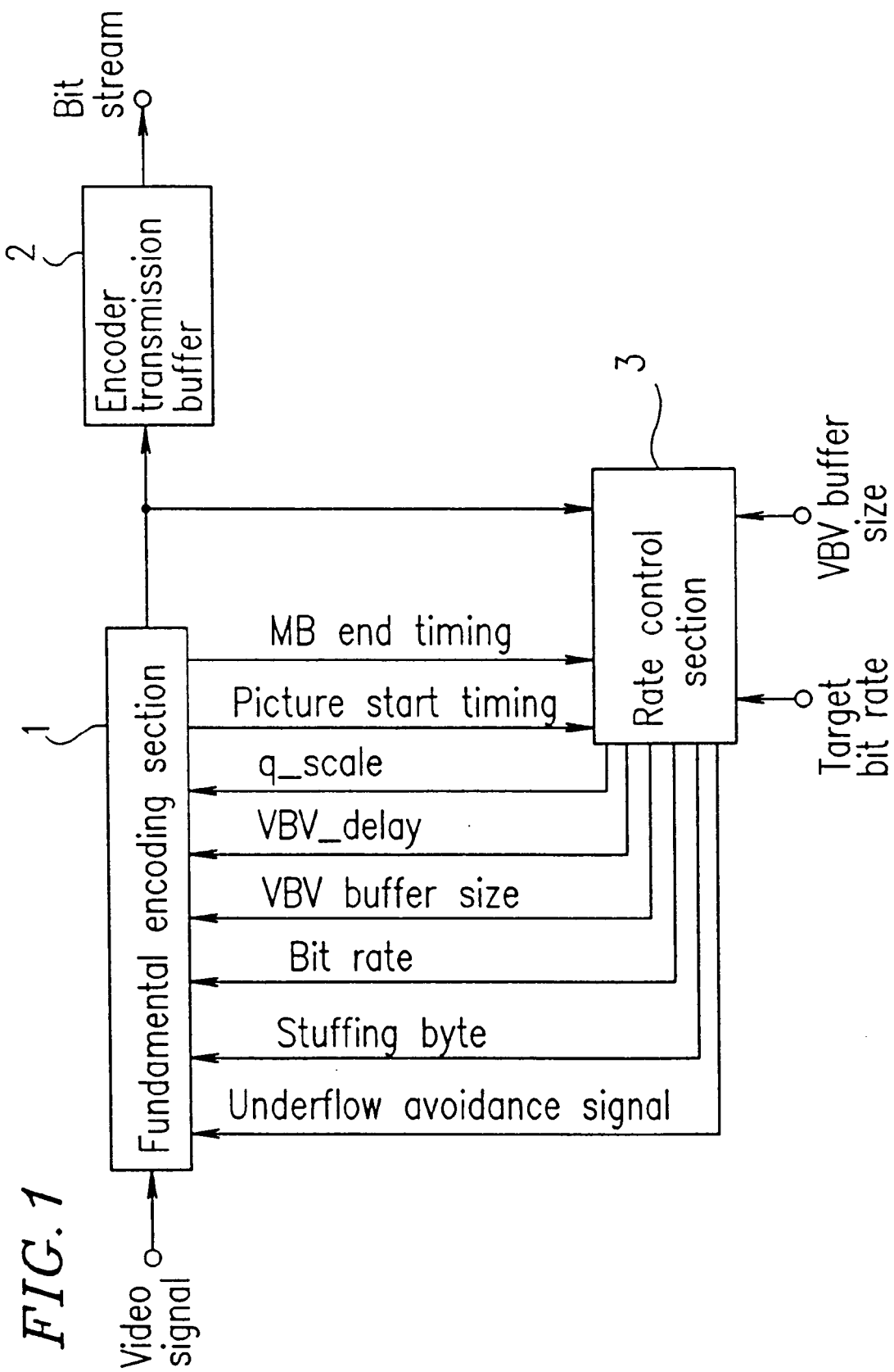
FIG. 1 is a block diagram schematically illustrating an image compression/encoding apparatus according to Example 1 of the present invention.

FIG. 1 is a block diagram schematically illustrating an image compression/encoding apparatus according to Example 1 of the present invention. The image compression/encoding apparatus according to Example 1 encodes a video signal into image data by using a fundamental encoding section 1, and transmits the image data through an encoder transmission buffer 2. A rate control section 3 controls a quantization width q_scale by which the video signal is encoded by the fundamental encoding section 1.

Hereinafter, a process for encoding a video signal will be schematically described with reference to FIG. 2.

Each picture in a video signal to be encoded is divided into a plurality of macroblocks before being encoded. Each macroblock is divided into a 16×16 pixel block of data for luminance and two 8×8 pixel blocks of data for color difference. The 16×16 pixel block of data for luminance is further divided into four 8×8 pixel blocks. The 8×8 pixel block is the fundamental encoding process unit. The macroblock is encoded by the blocks. The encoding method and the quantization width for the blocks in the macroblock are determined for each macroblock.

A slice is a unit of data which includes a plurality of macroblocks. A picture includes a plurality of slices. The pictures are classified into three types depending upon how the picture is encoded: a picture which is encoded as it originally is (known as an "intrapicture", and hereinafter referred to as an "I picture"); a picture which is encoded using motion estimation based on a past picture (hereinafter referred to as a "P picture"); and a picture which is encoded using motion estimation based on either or both of past and future pictures (hereinafter referred to as a "B picture").

Figure 2:
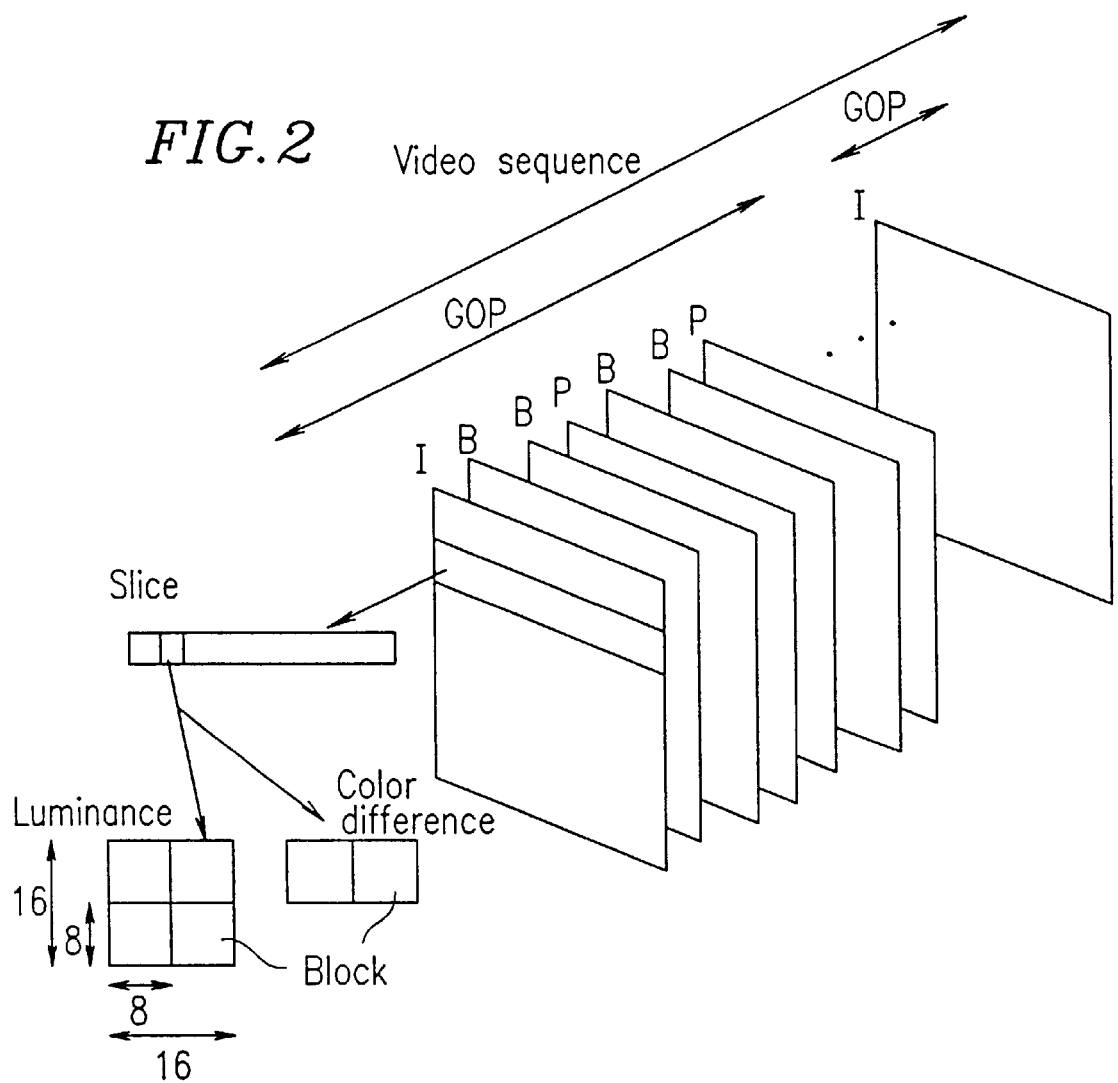
FIG. 2 is a diagram schematically illustrating a process for encoding a video signal.

FIG. 2 illustrates a typical example of how the I, P and B pictures are arranged in a GOP. The first I picture is used to estimate and encode the fourth picture (the P picture). The intervening B pictures are estimated and encoded from the I and P pictures. As described above, the I picture is encoded first; the P picture is encoded next; and then the B pictures are encoded. Therefore, it is necessary to alter the original temporal order of the pictures (I, B, P) before encoding these pictures.

Then, a GOP (group of pictures) is formed from a plurality of pictures beginning with the I picture, and a video sequence is formed from any number of GOPs.

Such an encoding process is performed by the fundamental encoding section 1 in the apparatus illustrated in FIG. 1. The configuration of the fundamental encoding section 1 is illustrated in FIG. 3.

Figure 3:
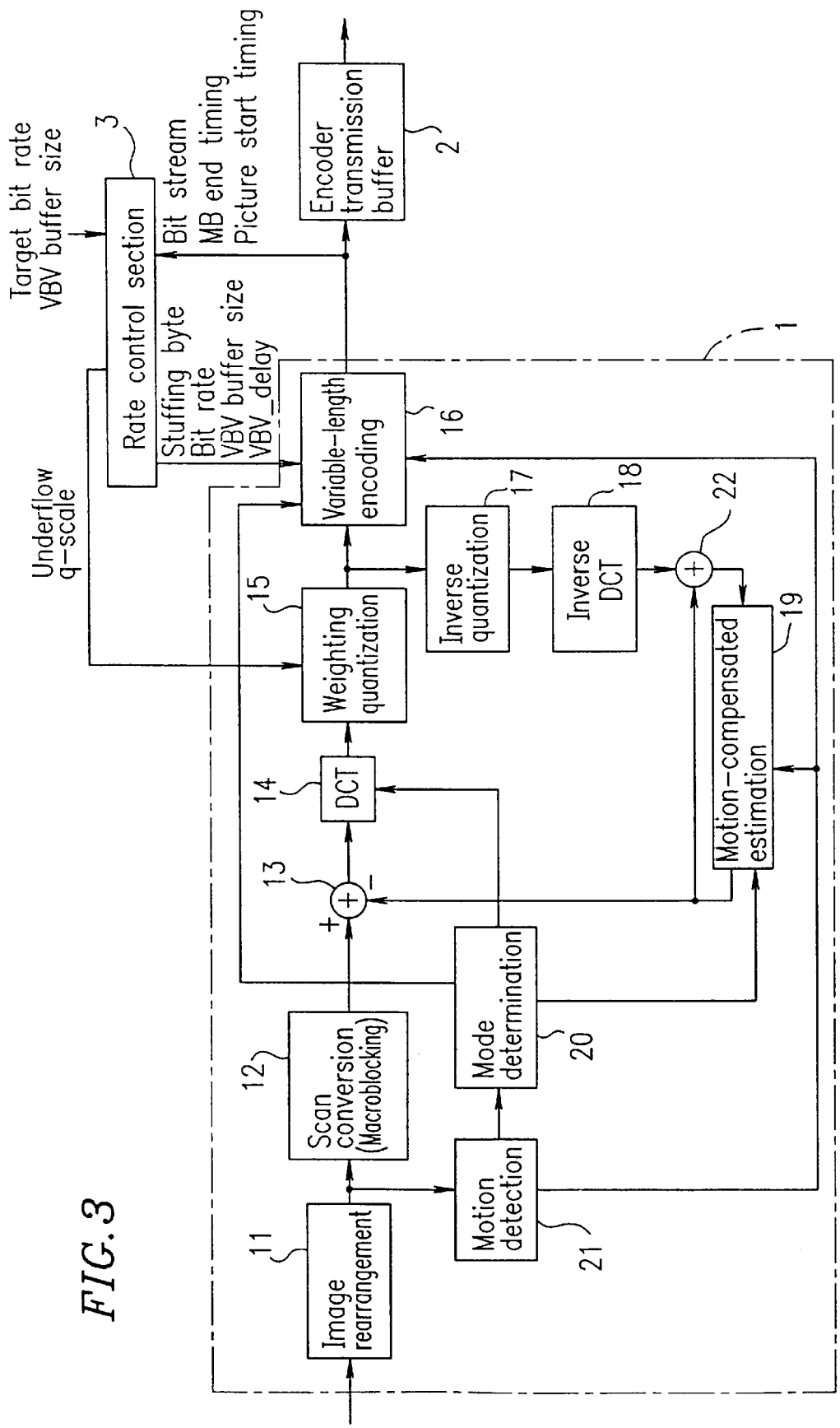
FIG. 3 is a block diagram illustrating a fundamental encoding section provided in the apparatus illustrated in FIG. 1.

In FIG. 3, reference numeral 11 denotes an image rearranging section for receiving a video signal representing a plurality of pictures and rearranging the pictures in the order of encoding; 12 denotes a scan conversion section for converting the pictures into macroblocks by which the encoding is performed; 13 denotes a difference section for determining the difference between the macroblock and the estimation data according to the motion of a video image in the picture; 14 denotes a DCT transform section for encoding the difference output from the difference section 13; 15 denotes a weighting quantization section; 16 denotes a variable-length encoding section; 17 denotes an inverse quantization section; 18 denotes an inverse DCT section; 19 denotes a motion-compensated estimation section; 20 denotes a mode determination section; 21 denotes a motion detection section; and 22 denotes an addition section.

In the fundamental encoding section 1 having such a configuration, the image rearranging section 11 receives the pictures represented by the video signal, rearranges the pictures in the order of encoding, and then sequentially outputs these pictures to the scan conversion section 12.

Each time the scan conversion section 12 receives a picture, it divides the picture into a plurality of macroblocks and sequentially outputs the macroblocks to the difference section 13. The difference section 13 determines the difference between the macroblock from the scan conversion section 12 and the estimation data from the motion-compensated estimation section 19, and outputs the difference as an estimation error. The DCT transform section 14 performs a DCT transform on the estimation error by the 8×8 pixel blocks, and the transform coefficients obtained through the DCT transform are output to the weighting quantization section 15. The weighting quantization section 15 quantizes the transform coefficients, and outputs the resulting quantization data to the variable-length encoding section 16. The variable-length encoding section 16 performs variable-length encoding so as to produce compressed/encoded image data. The compressed/encoded image data is once stored in an encoder transmission buffer before being output for transmission at a desired transmission rate.

On the other hand, the quantization data output from the weighting quantization section 15 is subjected to a reproduction process by the inverse quantization section 17 and the inverse DCT section 18, and then input to the motion-compensated estimation section 19 where an estimation data representing a motion-estimated picture is formed. The estimation data is input to the difference section 13 where a difference between the estimation data and the macroblock from the scan conversion section 12 is determined. For each macroblock, the motion detection section 21 calculates a motion vector of a video image and inputs the motion vector to the motion-compensated estimation section 19 while sending it also to the variable-length encoding section 16. The rate control section 3 compares the bit generation number of a bit stream output from the variable-length encoding section 16 with the target bit generation number calculated from the target bit rate, and controls the quantization width q_scale of the weighting quantization section 15 so that the encoding is eventually completed with the target bit generation number.

In accordance with the MPEG standard, a virtual decoder called "VBV" is virtually provided, whereby it is necessary to control the VBV so that the input buffer of the VBV (hereinafter, referred to simply as the "VBV buffer") does not overflow or underflow. The input/output of the VBV buffer is defined by the MPEG standard.

Figure 4:
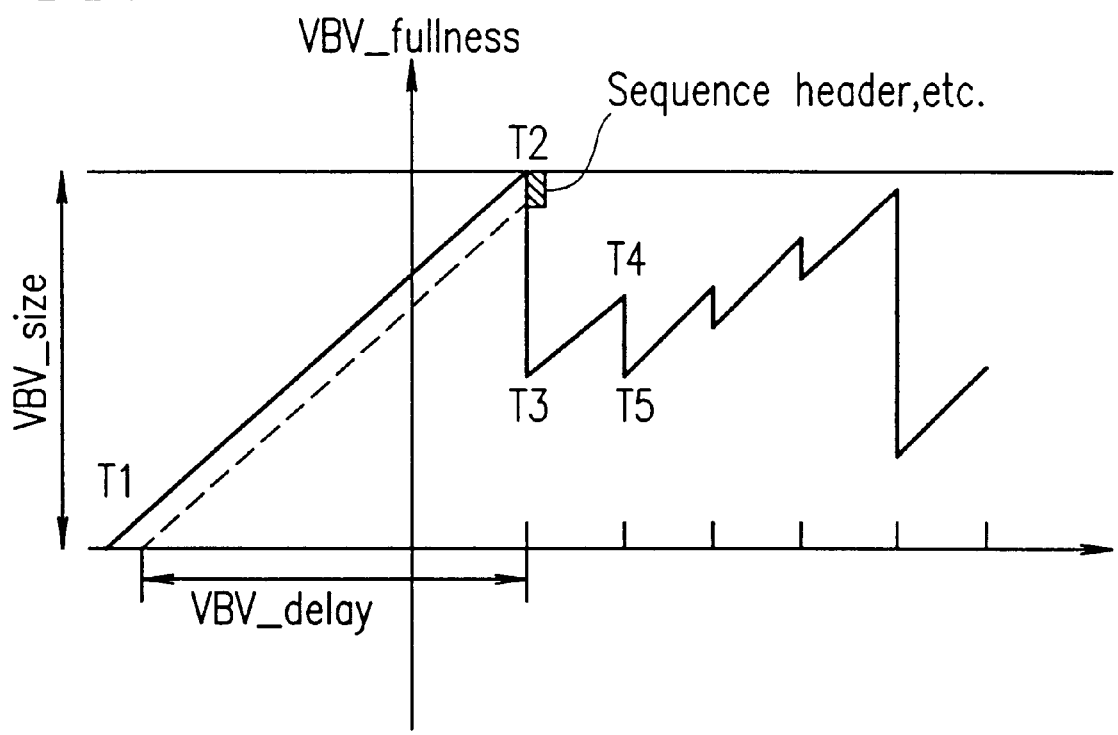
FIG. 4 is a diagram showing a fullness of a VBV buffer when encoding a video signal at a fixed rate.

FIG. 4 shows the data fullness in the VBV buffer when a video signal is encoded at a fixed rate. In FIG. 4, the horizontal axis represents time, in which the distance between two adjacent scale marks corresponds to a period of time consumed while inputting one picture. The vertical axis represents the data fullness VBV_fullness of the VBV buffer. Initially, while an image data is not reproduced, the image data is stored in the VBV buffer for the period of time VBV_delay indicated in the picture header of the image data (e.g., the period of time between T1 and T2, while the image data obtained by encoding one picture is input). Since the image data is input at a fixed rate, the fullness VBV_fullness of the VBV buffer is represented by a straight line with a fixed gradient during this period of time. Next, at T3, when a picture is reproduced, the image data of one picture is momentarily removed from the VBV buffer. Then, until T4, immediately before the next picture is reproduced, the fullness VBV_fullness of the VBV buffer increases by the number of bits corresponding to one picture. At T5, when the picture is reproduced, the image data corresponding to one picture is momentarily removed from the VBV buffer. Thereafter, the process continues in such a manner. It is necessary for the encoding apparatus to control transmission of the image data so that the fullness VBV_fullness of the VBV buffer does not fall out of the VBV buffer size VBV_size (i.e., so that it does not underflow or overflow).

The variable-length encoding section 16 of the fundamental encoding section 1 transmits an MB end timing signal to the rate control section 3 each time an encoding process for a macroblock is finished, and transmits a picture start timing signal to the rate control section 3 each time an encoding process for a picture is finished. The rate control section 3 determines the actual bit generation number Bmb per macroblock based on a bit stream from the variable-length encoding section 16 each time the MB end timing signal is input, determines the quantization width q_scale based on the actual bit generation number Bmb, and sends the quantization width q_scale to the fundamental encoding section 1.

Figure 5:
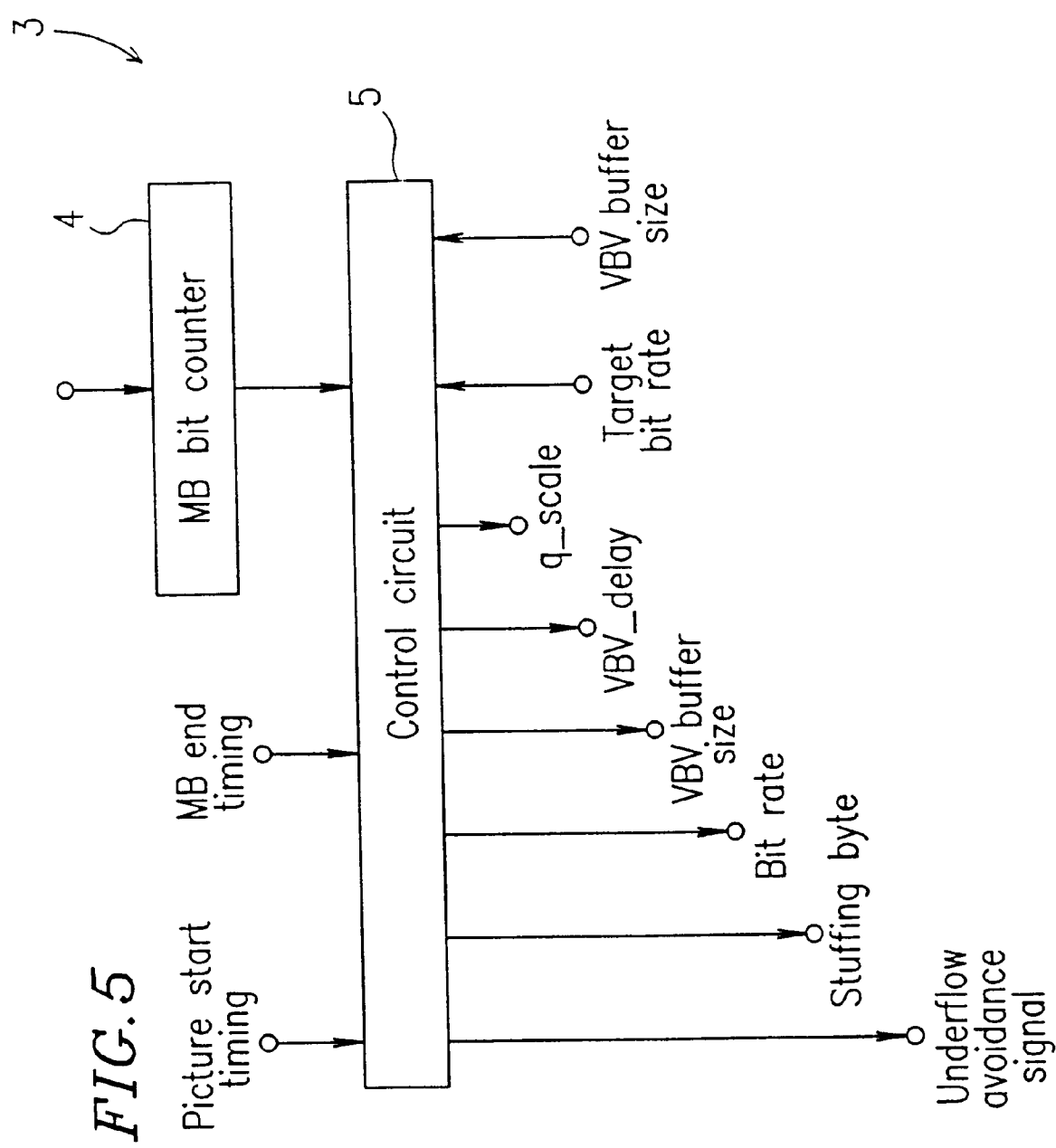
FIG. 5 is a block diagram illustrating a rate control section provided in the apparatus illustrated in FIG. 1.

FIG. 5 shows the configuration of the rate control section 3. Referring to the figure, an MB counter 4 counts the bit generation number to be used for encoding each macroblock, based on a bit stream from the variable-length encoding section 16. A control circuit 5 receives the MB end timing signal and the picture start timing signal, and determines the actual bit generation number Bmb for each macroblock based on the count of the MB counter 4 each time the MB end timing signal is input. Moreover, the control circuit 5 externally receives the target bit rate and the VBV buffer size VBV_size, determines the quantization width q_scale for each macroblock based on the actual bit generation number Bmb, the VBV buffer size VBV_size, etc., and supplies the quantization width q_scale to the weighting quantization section 15 of the fundamental encoding section 1. Furthermore, the control circuit 5 outputs an underflow avoidance signal to the weighting quantization section 15 when the VBV buffer comes near to underflowing. Moreover, the control circuit 5 outputs, to the variable-length encoding section-16, signals representing the period of time VBV_delay, the target bit rate, and the VBV buffer size VBV_size, as the header information of the image data.

Figure 6:
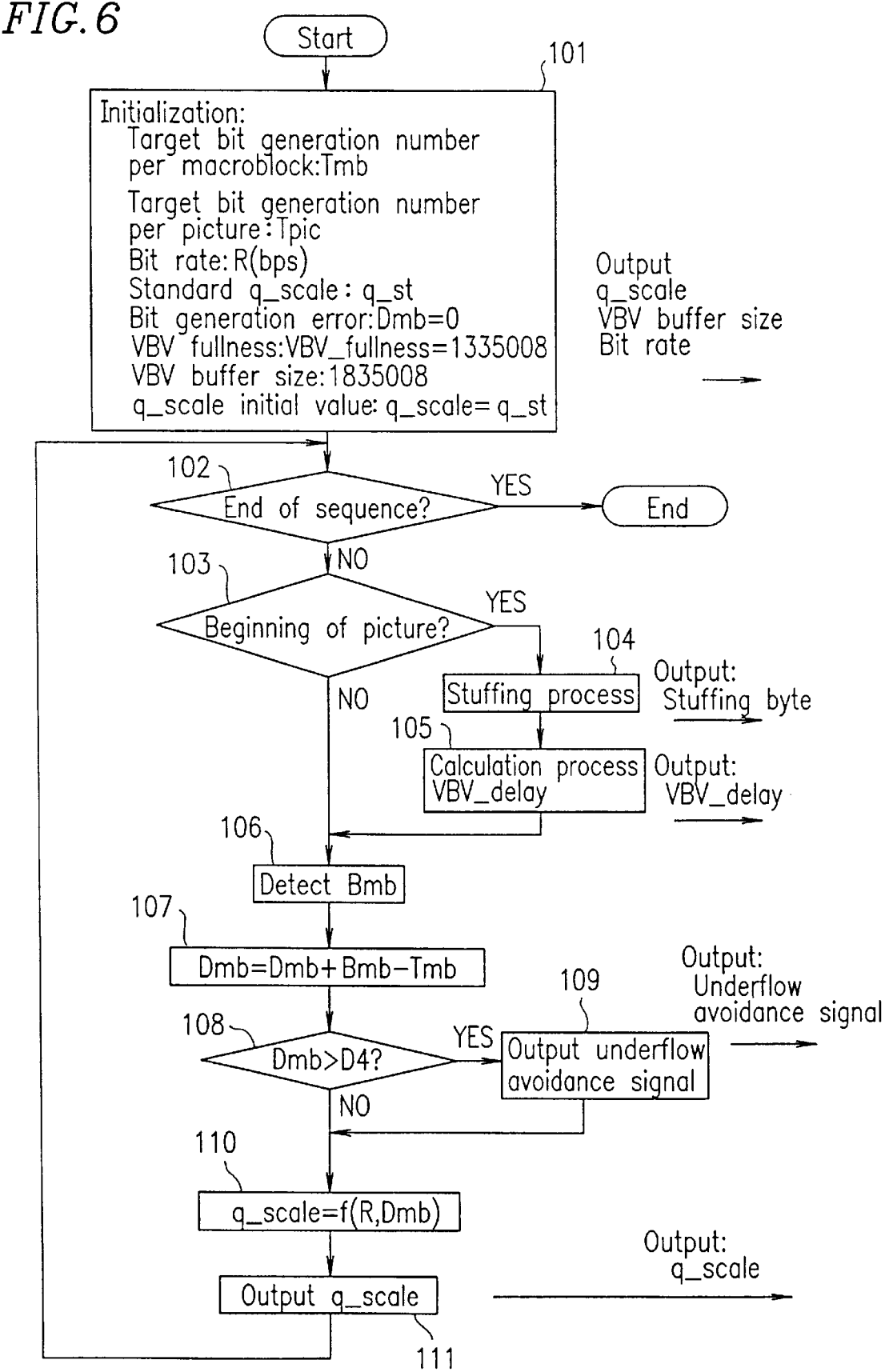
FIG. 6 is a flow chart showing an encoding process of the apparatus illustrated in FIG. 1.

Such a process is performed in accordance with a flow chart shown in FIG. 6.

First, the control circuit 5 of the rate control section 3 initializes the target bit generation number Tmb for one macroblock, the target bit generation number Tpic for one picture, the target bit rate R (bps), the standard quantization width q_st, the bit generation error Dmb, the fullness VBV_fullness of the VBV buffer, the VBV buffer size VBV_size, and the quantization width q_scale (step 101).

In this initialization step, assuming the target bit rate is externally received as a bit rate per macroblock, the target bit rate is set as the target bit generation amount Tmb for one macroblock. The target bit generation number Tpic for one picture may be obtained by multiplying the initial value of the target bit generation number Tmb by the number of macroblocks in one picture (Tpic=Tmb×(the number of macroblocks in one picture). The target bit rate R (bps) is determined by multiplying the target bit generation amount Tpic for one picture by the frame rate (R=Tpic×(the frame rate)).

Presuming that the encoding is performed using a quantization matrix defined by the standard, the standard quantization width q_st is set to 6 when the target bit rate R (bps) is approximately 3 Mbps, the standard quantization width q_st is set to 5 when the target bit rate R (bps) is 4 Mbps or greater, and the standard quantization width q_st is set to 4 when the target bit rate R (bps) is 6 Mbps or greater. Although the standard quantization width q_st is thus determined in accordance with the target bit rate R (bps), the standard quantization width q_st may be set to any other appropriate value.

In this example, the target bit rate R (bps) is set to 3 Mbps, while the standard quantization width q_st is set to 6.

Figure 8:
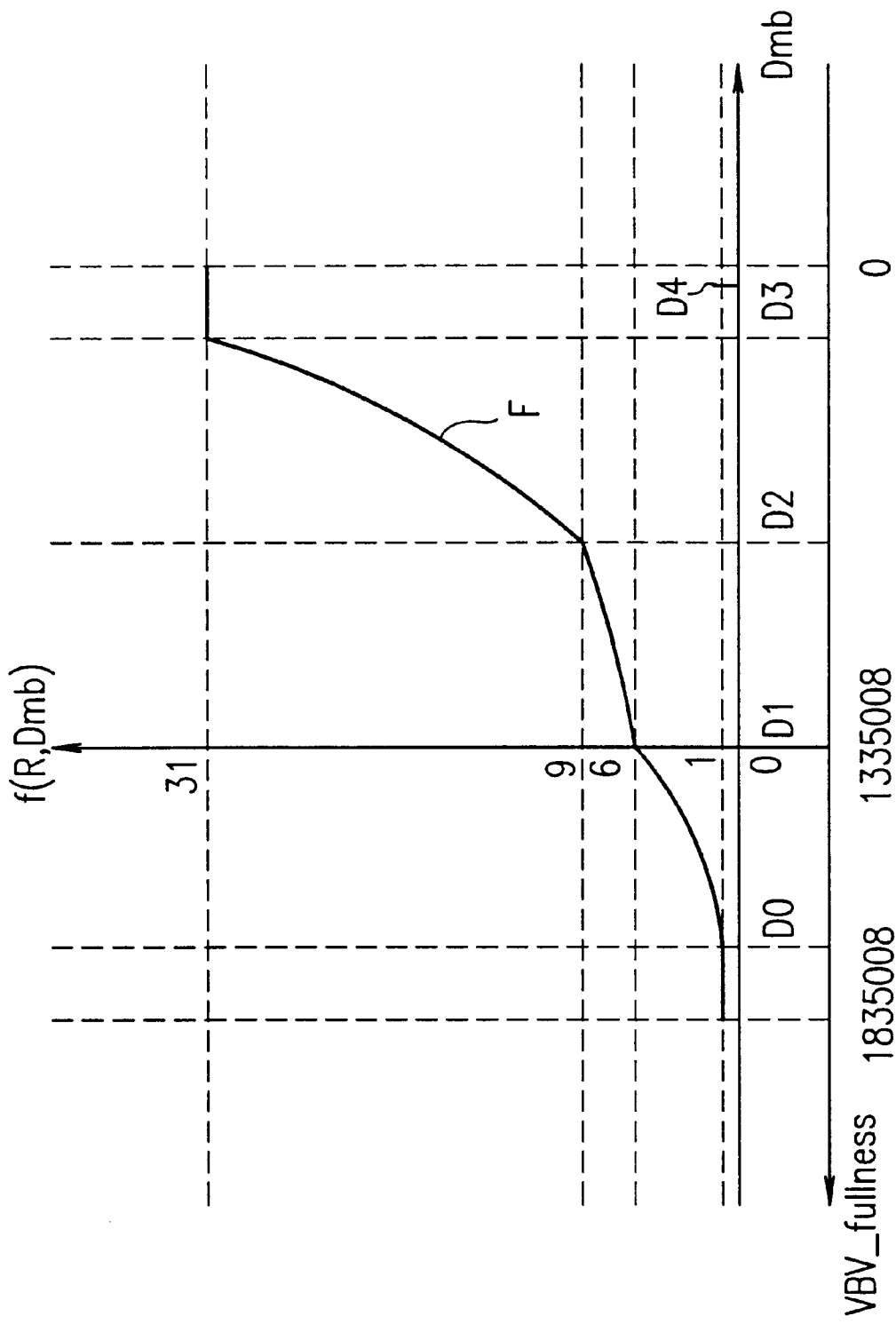
FIG. 8 is a graph showing a characteristic of a function f(R, Dmb) for deriving a quantization width q_scale of the apparatus illustrated in FIG. 1.

The value of the bit generation error Dmb is initially set to 0. The VBV buffer size is externally specified. Herein, the VBV buffer size is 1835008 bits as specified by the MP@ML standard. As apparent from the graph shown in FIG. 8, the value of the fullness VBV_fullness of the VBV buffer corresponds to the bit generation error Dmb, and the value of VBV_fullness is initially set to 1335008 bits, which corresponds to the initial value 0 of the bit generation error. Therefore, when the position of the initial value 0 of the bit generation error along the horizontal axis of the graph shown in FIG. 8 is altered, the initial value of the fullness VBV_fullness is also altered. The value of the quantization width q_scale is also initially set to 6, as the standard quantization width q_st.

When the initialization step is completed, the control circuit 5 determines whether it is the end of a video signal sequence (step 102), and then determines whether it is the beginning of a picture (step 103). At this point of time, since the encoding of the video signal is just begun, it is determined to be not the end of the video signal sequence (step 102, No). Then it is determined to be the beginning of a picture (step 103, Yes), and the process proceeds to a stuffing process at step 104.

Figure 7:
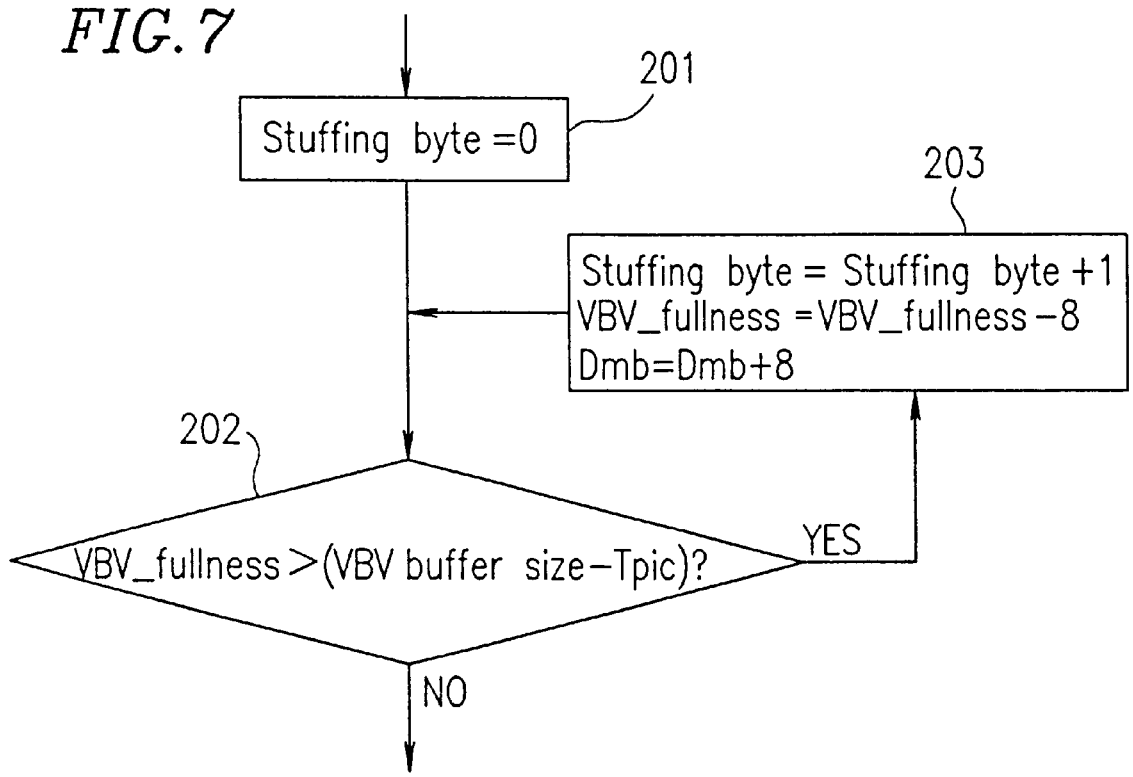
FIG. 7 is a flow chart showing a stuffing process at step 104 in the encoding process shown in FIG. 6.

The stuffing process at step 104 is performed in accordance with the procedure shown in FIG. 7. The control circuit 5 initializes a stuffing byte to 0 (step 201); compares the fullness VBV_fullness of the VBV buffer with a value VBV_size−Tpic obtained by subtracting the target bit generation number Tpic for one picture from the VBV buffer size VBV_size (step 202); if the fullness VBV_fullness of the VBV buffer is greater than the value VBV_size−Tpic (step 202, Yes), since the VBV buffer overflows during the encoding process to be performed for one picture, the stuffing byte is incremented to be 1. As the stuffing byte is incremented by one, the fullness VBV_fullness of the VBV buffer is updated by subtracting 8 from VBV_fullness, and the bit generation error Dmb is updated by adding 8 to the bit generation error Dmb (step 203); and the process returns to step 202.

Therefore, whenever it is determined that the fullness VBV_fullness of the VBV buffer is greater than the value VBV_size−Tpic (step 202, Yes), the stuffing byte is incremented by one, the fullness VBV_fullness of the VBV buffer is accordingly reduced by 8, and the bit generation error Dmb is accordingly increased by 8 (step 203). If the fullness VBV_fullness of the VBV buffer is determined to be less than the value VBV_size−Tpic (step 202, No), the value of the stuffing byte at the time is notified to the variable-length encoding section 16. The variable-length encoding section 16 performs a stuffing process according to the value of the stuffing byte so as to prevent the VBV buffer from overflowing. The stuffing process is performed by transmitting a data string composed of some bytes of 0's successively after the image data obtained by encoding a picture. Thus, the image data for the picture is apparently increased, so as to increase the amount of image data to be removed from the VBV buffer.

However, immediately after initialization, since the fullness VBV_fullness of the VBV buffer is determined to be less than the value VBV_size−Tpic (step 202, No), the stuffing byte 0 is notified to the variable-length encoding section 16, whereby the stuffing process is not performed.

Thereafter, the control circuit 5 calculates the period of time VBV_delay from either Expression (1) or (2) (step 105).

For B and P pictures:

$$VBV\_delay = 90000 \times (VBV\_fullness + Tpic)/R \quad (1)$$

For an I picture:

$$VBV\_delay = 90000 \times (VBV\_fullness + Tpic - \text{the number of header bits})/R \quad (2)$$

Herein, R denotes the target bit generation number per second; and the number of header bits is the number of bits from the first bit in the video sequence header to the bit immediately before the picture header.

The period of time VBV_delay is transmitted to the decoding apparatus as the header information of the image data obtained by encoding a picture. If the image data is input to the VBV buffer for the first time, the decoding apparatus waits for the period of time VBV_delay indicated in the header information that the image data is stored in the VBV buffer, and then begins to decode the image data.

While performing the processes hitherto, the fundamental encoding section 1 begins an encoding process for a picture. The control circuit 5 of the rate control section 3 determines the actual bit generation number Bmb for one macroblock based on the count of the MB counter 4 each time the MB end timing signal is input (step 106). The control circuit 5 updates the bit generation error Dmb by adding the difference between the actual bit generation number Bmb and the target bit generation number Tmb to the bit generation error Dmb, based on Expression (3) below (step 107).

$$Dmb = Dmb + Bmb - Tmb \quad (3)$$

If the amount of information for one macroblock is too large or too small, the actual bit generation number Bmb becomes larger or smaller than the target bit generation number Tmb, thereby generating some bit generation error Dmb. If the amount of information for one macroblock is appropriate, the actual bit generation number Bmb coincides with the target bit generation number Tmb, whereby the bit generation error Dmb is 0.

Successively, the control circuit 5 confirms that the bit generation error Dmb does not exceed the threshold value D4 (step 108, No), and then determines the quantization-width q_scale from a function f(R, Dmb) based on Expressions (4), (5), (6), (7) and (8) below (step 110).

When Dmb<D0:

$$f(R, Dmb) = 1 \quad (4)$$

When D0≦Dmb<D1:

$$f(R, Dmb) = q\_st \times R/(R - K1 \times Dmb) \quad (5)$$

When D1≦Dmb<D2:

$$f(R, Dmb) = q\_st \times R/(R - K2 \times Dmb) \quad (6)$$

When D2≦Dmb<D3:

$$f(R, Dmb) = q\_st \times R/(R - K3 \times Dmb) - K4 \quad (7)$$

When Dmb≧D3:

$$f(R, Dmb) = 31 \quad (8)$$

Herein, as is apparent from the graph shown in FIG. 8 which shows the characteristic of the function f(R, Dmb) based on Expressions (4), (5), (6), (7) and (8) above, D0<D1<D2<D3, D0=−400000, D1=0, D2=600000, and D3=1200000. Moreover, K1 is set to a value such that f(R, Dmb)=1 is true when Dmb=D0; K2 is set to a value such that f(R, Dmb)=9 is true in the vicinity of Dmb=2; and K3 and K4 are each set to a value such that f(R, Dmb)=9 is true when Dmb=D2 while f(R, Dmb) is equal to or around 31 in the vicinity of Dmb=D3. In this example, K1=37.5, K2=1.67, K3=2.0, and K4=1.0, whereby the characteristic curve F of f(R, Dmb) becomes a continuous curve.

After the quantization width q_scale=f(R, Dmb) is thus determined, the control circuit 5 rounds off the fractional portion of the quantization width q_scale, and then supplies the quantization width q_scale to the weighting quantization section 15 (step 111). The weighting quantization section 15 quantizes the transform coefficients obtained through the DCT transform according to the quantization width q_scale, and outputs the resulting quantization data to the variable-length encoding section 16. The variable-length encoding section-16 performs a variable-length encoding process for the quantization data so as to produce compressed/encoded image data.

Thereafter, steps 102 through 111 are repeated so as to sequentially encode the macroblocks. For each iteration, the actual bit generation number Bmb for one macroblock is determined; the bit generation error Dmb accumulated during the encoding process so far is determined; the bit generation error Dmb is assigned to the function f(R, Dmb) so as to determine the quantization width q_scale; the transform coefficients obtained through the DCT transform are quantized in accordance with the quantization width q_scale; and a variable-length coding process is performed for the quantization data so as to produce compressed/encoded image data.

While repeating steps 102 to 111, if the bit generation error Dmb exceeds the threshold value D4 (step 108, Yes) (i.e., if the actual bit generation number Bmb is much greater than the target bit generation number Tmb and the bits are overused and insufficient for encoding the picture), since the VBV buffer may possibly underflow, the underflow avoidance signal is output to the weighting quantization section 15 (step 109). In response to this, the weighting quantization section 15 encodes only the DC components of the macroblock, thereby reducing the amount of codes of the image data. Thus, the overuse of the bits is suppressed, whereby the actual bit generation number Bmb approaches the target bit generation number Tmb.

As is apparent from the graph shown in FIG. 8, when D0<Dmb<D1 (i.e., when the bit generation error Dmb varies in the vicinity of approximately ½ of the VBV buffer size VBV_size), the variation of the quantization width q_scale is small. For example, when the quantization width q_scale is around 6, the variation of the quantization width q_scale is about 1, even if the bit generation error Dmb varies by about 300 Kbit.

Thus, as long as the bit generation error Dmb varies so that the q_scale varies around 6, the quantization width q_scale is kept substantially constant, and the variation of the actual bit generation number Bmb for one macroblock depends upon the amount of information of the macroblock. Therefore, as long as the standard quantization width q_st (=6) is appropriately set, even if the amount of information in the latter part of a macroblock of a picture varies from that of the first part thereof, it is possible to supply an optimal bit generation number for each macroblock, whereby it is possible to prevent the bit generation number consumed for encoding one picture from being insufficient or excessive.

Moreover, the variation of the bit generation number consumed for encoding one picture depends upon the amount of information of the picture. Therefore, as long as the standard quantization width q_st (=6) is appropriately set, it is possible to supply an optimal bit generation number for each picture.

In a region where the quantization width q_scale takes a relatively large value, the influence of the variation of the quantization width q_scale on the bit generation number consumed for encoding one picture is reduced, whereby the target bit rate can be maintained even when encoding a picture containing relatively complicated images.

Moreover, since the quantization width q_scale is determined based on the bit generation error Dmb, even when encoding a picture immediately after a scene change, an encoding process can be performed with a quantization width q_scale, which is approximately the same as that when encoding an I picture, without considerably changing the quantization width q_scale. As a result, even immediately after a scene change, the video signal can be encoded so that only little deterioration occurs in the quality of the reproduced image.

As is apparent from the above description, in the above-described example, for each encoding process of a macroblock, the bit generation error Dmb (the difference between the bit generation number consumed for the encoding process so far and the target bit generation number calculated from the target bit rate) is calculated, and the quantization width q_scale is determined based on a ratio between a value, obtained by subtracting from the target bit rate a value proportional to the bit generation error Dmb, and the target bit rate.

It is supposedly true that, when encoding a video image, the product of the quantization width q_scale and the bit generation number consumed for the encoding process will be constant for different quantization widths. When a function f(R, Dmb) is provided for deriving the quantization width q_scale, the bit generation number to be consumed when sequentially encoding approximately identical pictures varies in accordance with the quantization width q_scale so that the product is substantially constant for different quantization widths, and is set to a value obtained by subtracting a multiple of the bit generation error Dmb from the target bit generation number. Therefore, the bit generation number consumed for the encoding process can be controlled to the target bit generation number as when controlling the bit generation number consumed for an encoding process by a linear feedback control.

Moreover, when D0≦Dmb<D1, since the coefficient K1 is set to a small value so that the quantization width q_scale varies around the range of 6 to 9, in this quantization width q_scale range of 6 to 9, the bit generation number consumed for the encoding process is likely to vary, and the bit generation error Dmb is also likely to vary, whereby the VBV buffer size VBV_size may be effectively utilized. Thus, to the limit of the capability of the decoding apparatus, the bit generation number consumed for the encoding process can be varied in accordance with the variation of the amount of information due to a scene change or a rapid motion of the image.

Conventionally, the target bit generation number is set for each picture and, for each macroblock to be encoded, a control is performed such that the bit generation number consumed for encoding a macroblock becomes nearly constant. Therefore, due to the distribution of complexity of the video image in the picture, the quantization width for a macroblock becomes relatively small immediately after encoding a simple pattern, whereas the quantization width for a macroblock becomes relatively large immediately after encoding a complicated pattern. Thus, there is a tendency for the quality of the reproduced image to be unstable.

On the contrary, in this example of the present invention, while effectively utilizing the size of the VBV buffer having a capacity much larger than that of a picture, a control is performed such that the bit generation number consumed for an encoding process varies. Therefore, it is possible to prevent the quality of the reproduced image from being unstable due to the distribution of complexity of the video image in the picture.

Moreover, in the present example, for plainly describing the control of the target bit rate and the control of the VBV buffer, both the bit generation error Dmb and the fullness VBV_fullness of the VBV buffer are used in the description. The two values have a relationship as shown in Expression (9) below, where one of them can be derived from the other.

$$VBV\_fullness = (\text{initial value of VBV\_fullness}) - Dmb \qquad (9)$$

Therefore, based on Expression (9), it is possible to perform the stuffing process for avoiding an overflow (step 104), and to perform an underflow avoidance process (step 109), and the like, which are all encompassed by the present invention. Similarly, all of these processes are possible only with VBV_fullness.

In other words, conventionally, it has been necessary to separately control the target bit rate and the VBV buffer. The present invention makes it possible to perform a unified control by controlling only one of the bit generation error Dmb and the fullness VBV_fullness.

Although, the VBV buffer size VBV_size is set to a value specified by the MP@ML standard of MPEG2 in the present example, the VBV buffer size VBV_size may be altered, while a function for deriving the quantization width q_scale can be set so that the fullness VBV_fullness is controlled within the above range of size.

Moreover, although the target bit rate R (bps) is set to 3 Mbps in the present example, the present example can be applied to any other bit rate.

Furthermore, although an encoding apparatus of MPEG2 is described in the present example, the present example can be applied to a similar encoding apparatus and a similar encoding method.

Furthermore, although the coefficient K1 is set to a small value when D0≦Dmb<D1 so that the quantization width q_scale varies around the range of 6 to 9, the quantization width q_scale in the vicinity of the threshold value D2 may be set to about 8 if the degree of difficulty of encoding a video signal is expected to be low (for example, in the case of a movie, or the like, the encoding is relatively easy, and the quantization width q_scale may be set to a relatively small value), or if the image quality required for the reproduced image is low. Moreover, when the target bit rate is about 4 Mbps, for example, the variation of the quantization width q_scale in the range between D1 and D2 may be set to about 5 to 7; and the quantization width q_scale in the range between D1 and D2 can be set to some value which does not exceed 10 when employing a default quantization matrix defined by the standard or a similar quantization matrix. Moreover, the threshold values D0, D1, D2, D3 and D4 may be shifted with respect to one another by an amount in a range of about several hundred Kbit. In short, in the above-described example of the present invention, the quantization width q_scale, and the threshold values D0, D1, D2, D3 and D4 are not limited to those described above, but each of them may be altered to any other appropriate value.

Figure 9:
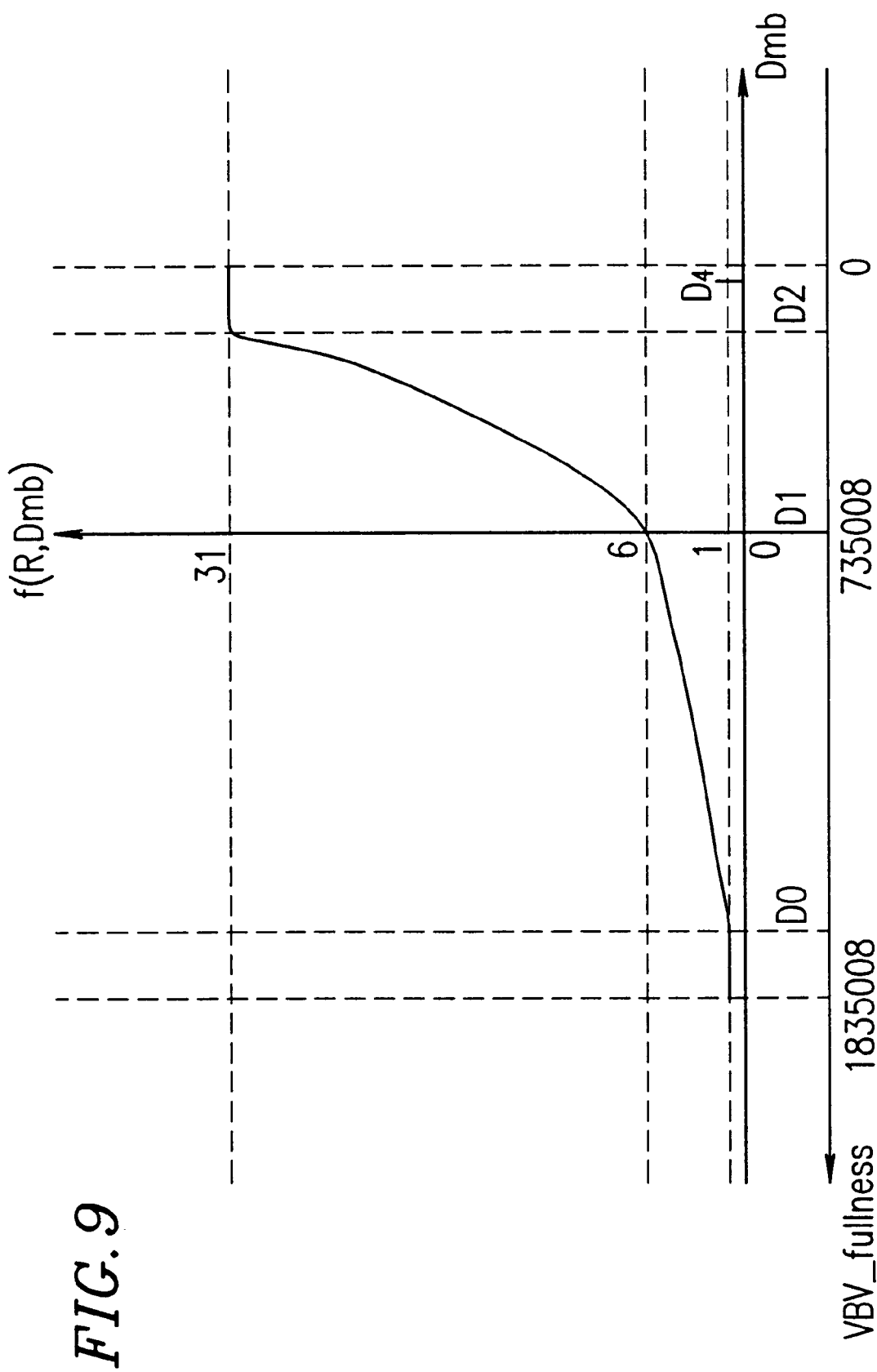
FIG. 9 is a graph showing a characteristic of another function f(R, Dmb) for deriving the quantization width q_scale of the apparatus illustrated in FIG. 1.

FIG. 9 shows a characteristic of another function f(R, Dmb) for deriving the quantization width q_scale, where the standard quantization width q_st is set to 5.

The characteristic of the function f(R, Dmb) shown in FIG. 9 may be represented by Expressions (10), (11), (12) and (13) below:

When Dmb<D0:

$$f(R, Dmab)=1 \quad (10)$$

When D0≦Dmb<D1:

$$f(R, Dmb)=q\_st \times R/(R-K1 \times Dmb) \quad (11)$$

When D1≦Dmb<D2:

$$f(R, Dmb)=q\_st \times R/(R-K2 \times Dmb) \quad (12)$$

When Dmb≧D2:

$$f(R, Dmb)=31 \quad (13)$$

Herein, K1 is set to a value such that f(R, Dmab)=1 is true when Dmb=−1000000; and K2 is set to a value such that f(R, Dmab)=31 is true when Dmb=600000.

The setting of the characteristic shown in FIG. 9 is effective for a sequence of pictures including generally still images or images with little motion, or for a sequence of pictures where a scene change frequently occurs.

When the conventional encoding method is applied to such a sequence of pictures, the bit generation number consumed for the encoding process is excessively localized in the I picture. As a result, the bit generation number to be assigned for the other pictures is reduced, while the fullness VBV_fullness of the VBV buffer increases, whereby the stuffing process is likely to occur.

For this reason, it is assumed that the encoding is performed with the quantization width q_scale corresponding to the range between D0 and D1. Therefore, even when, in a substantially still video image, an I picture is encoded with a quantization width q_scale which corresponds to a bit generation error Dmb in the vicinity of D0, and the bit generation number consumed for the encoding process is accordingly very large, it is still possible to maintain a low quantization width q_scale. Moreover, even when a scene change occurs during a GOP, since the variation of the quantization width q_scale is small in the range between D0 and D1, bits are assigned in accordance with the complexity of the picture.

When the picture to be encoded as described above has some temporal consistency, it is effective to appropriately set the threshold values D0, D1 and D2 and the coefficients K1 and K2 so as to determine a characteristic of the f(R, Dmab) suitable for the picture to be encoded.

Moreover, although the minimum value of the quantization width q_scale is set to 1 in the above example, in the case where the uniformity of the quality in reproduced images sought is more important, it is effective to set the minimum value of the quantization width q_scale to be 2 or greater, thereby setting the variation of the quantization width q_scale to be small.

Furthermore, it is applicable to provide many threshold values D0, D1, . . . , for the function f(R, Dmb) for deriving the quantization width q_scale, so that there are a large number of narrower ranges between the threshold values, while appropriately setting coefficients K1, K2, . . . , respectively for the ranges to derive the quantization width q_scale. In such a case, where more threshold values are provided so that there are narrower ranges therebetween, the characteristic of the quantization width q_scale may be approximated to a straight line for each range, thereby reducing the amount of calculation required for determining the quantization width q_scale. The value of each threshold value may be altered for an acceptable quality of the reproduced image.

Figure 10:
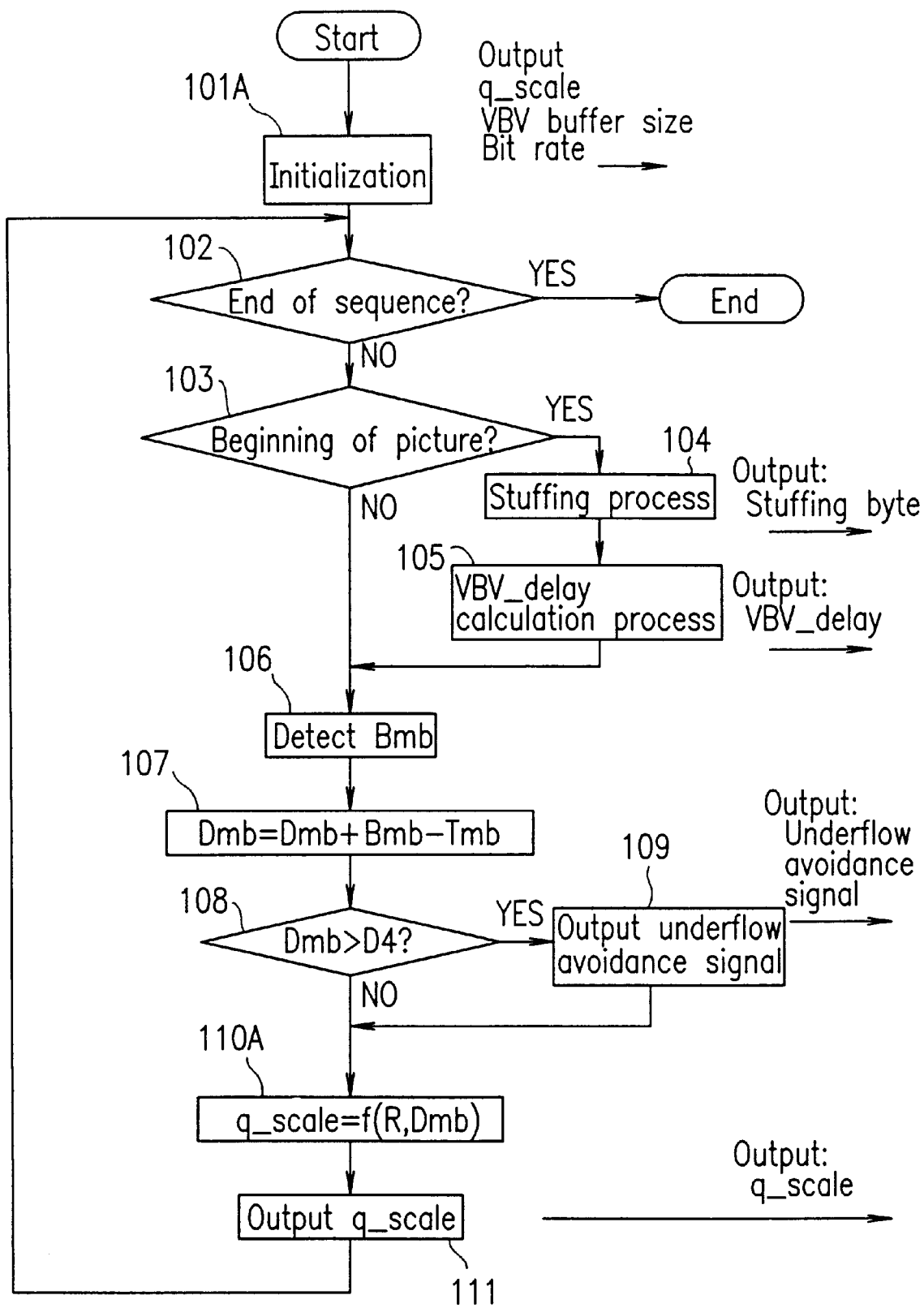
FIG. 10 is a flow chart showing an encoding process according to Example 2 of the present invention.

FIG. 10 is a flow chart showing an encoding process according to Example 2 of the present invention. The encoding process is performed by the encoding apparatus illustrated in FIGS. 1, 3 and 5.

The process shown in the flow chart of FIG. 10 is the same as that shown in the flow chart of FIG. 6 with steps 101 and 110 being substituted with steps 101A and 110A, respectively. The other steps 102 to 109 and 111 are the same as those shown in the flow chart of FIG. 6.

Figure 11:
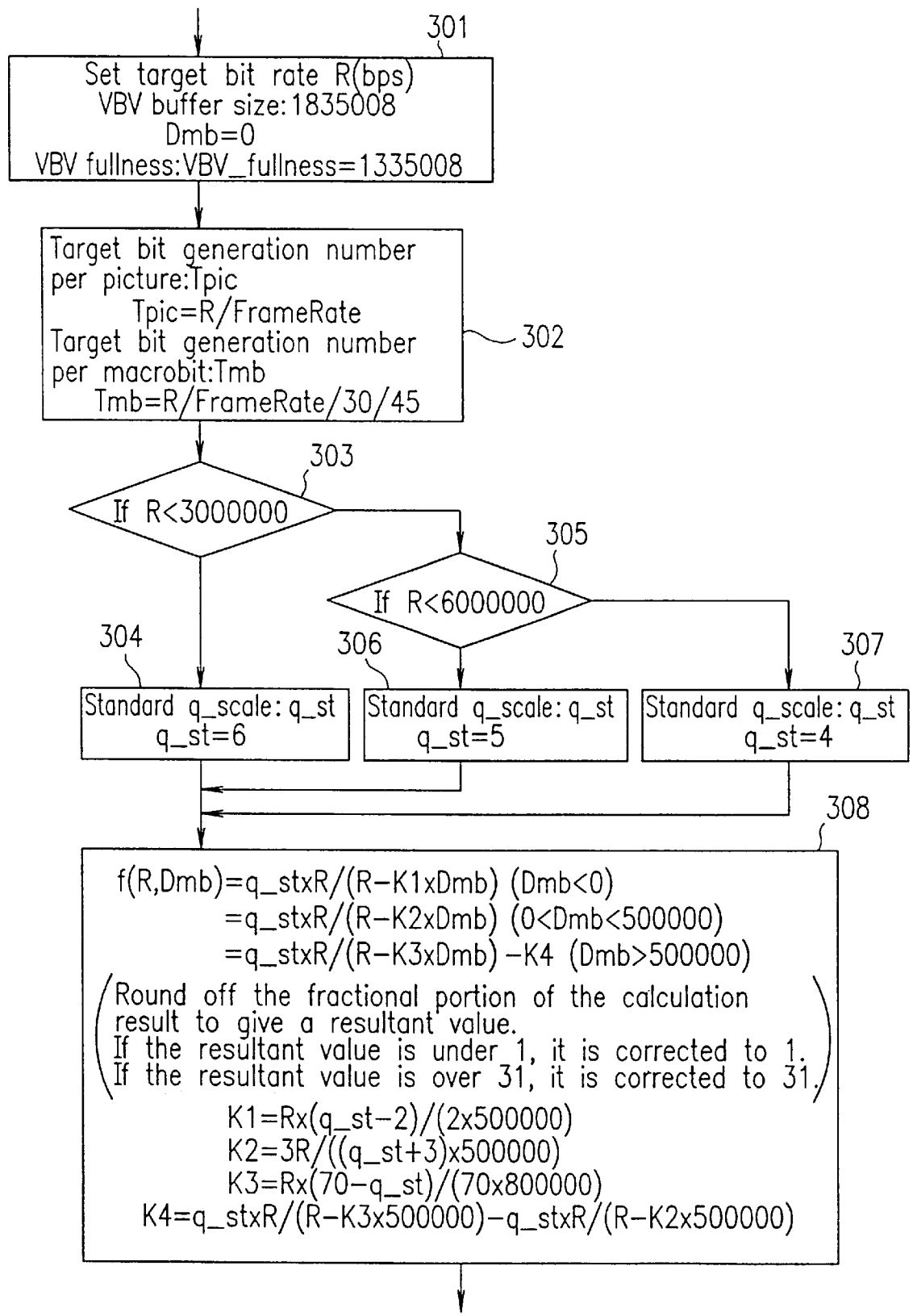
FIG. 11 is a flow chart showing an initialization process at step 101A in the encoding process shown in FIG. 10.

Therefore, the process shown in the flow chart of FIG. 10 is different from that shown in the flow chart of FIG. 6 only in the initialization process at step 101A and the process for deriving the quantization width q_scale at step 110A. Hereinafter, step 101A will be described in accordance with the flow chart shown in FIG. 11.

First, the control circuit 5 of the rate control section 3 sets the target bit rate R (bps) to a predetermined value, sets the size of the VBV buffer to 1835008 bits, sets the bit generation error Dmb to 0, and sets the fullness VBV_fullness to 1335008 bits (step 301).

Then, the control circuit 5 determines the target bit generation number Tpic for one picture by dividing the target bit rate R by the frame rate, and determines the target bit generation number Tmb for one macroblock by dividing the target bit rate R by the product of the frame rate and the number of macroblocks in one picture (step 302).

Subsequently, if the target bit rate R is less than 3 Mbps (step 303, Yes), the control circuit 5 sets the standard quantization width q_st to 6 (step 304); if the target bit rate R is less than 6 Mbps (step 305, Yes), the control circuit 5 sets the standard quantization width q_st to 5 (step 306); and if the target bit rate R is 6 Mbps or greater (step 305, No), the control circuit 5 sets the standard quantization width q_st to 4 (step 307).

After the standard quantization width q_st is thus set in accordance with the target bit rate R, the control circuit 5 assigns the target bit rate R and the standard quantization width q_st to Expressions (14), (15), (16) and (17) below so as to determine coefficients K1, K2, K3 and K4, and further assigns these coefficients K1, K2, K3 and K4, the target bit rate R and the standard quantization width q_st to Expressions (18), (19) and (20) to provide the function f(R, Dmb) (step 308).

$$K1=R\times(q\_st-2)/(2\times500000) \quad (14)$$

$$K2=3R/((q\_st+3)\times500000) \quad (15)$$

$$K3=R\times(70-q\_st)/(70\times800000) \quad (16)$$

$$K4=q\_st\times R/(R-K3\times500000)-q\_st\times R/(R-K2\times500000) \quad (17)$$

When Dmb<0:

$$f(R, Dmb)=q\_st\times R/(R-K1\times Dmb) \quad (18)$$

When $0 \leq Dmb < 500000$:

$$f(R, Dmb)=q\_st\times R/(R-K2\times Dmb) \quad (19)$$

When Dmb>500000:

$$f(R, Dmb)=q\_st\times R/(R-K3\times Dmb)-K4 \quad (20)$$

Herein, the fractional portion of the quantization width q_scale derived from the function f(R, Dmb) is rounded off. Moreover, when the resultant quantization width q_scale is 1 or less, the quantization width q_scale is set to 1; and when the resultant quantization width q_scale is 31 or greater, the quantization width q_scale is set to 31.

After setting the function f(R, Dmb) as shown in Expressions (18), (19) and (20), the control circuit 5 repeats steps 102 to 109, 110A and 111, while updating the quantization width q_scale by performing a calculation based on the function f(R, Dmb) each time the process comes to step 110A.

By appropriately setting the standard quantization width q_st in accordance with the target bit rate R as described above, it is possible to obtain a reproduced image with a stable image quality in accordance with the target bit rate R. For example, when the target bit rate R is low (e.g., 3 Mbps or less), the average quantization width increases. Therefore, if the function f(R, Dmb) which varies by a small rate of change of the quantization width is set in the vicinity of this average quantization width, the quality of the reproduced image becomes stable. Similarly, when the target bit rate R is high (e.g., 6 Mbps or less), the average quantization width is reduced. Therefore, if the function f(R, Dmb )which varies by a small rate of change of the quantization width is set in the vicinity of this average quantization width, the quality of the reproduced image becomes stable.

Figure 12:
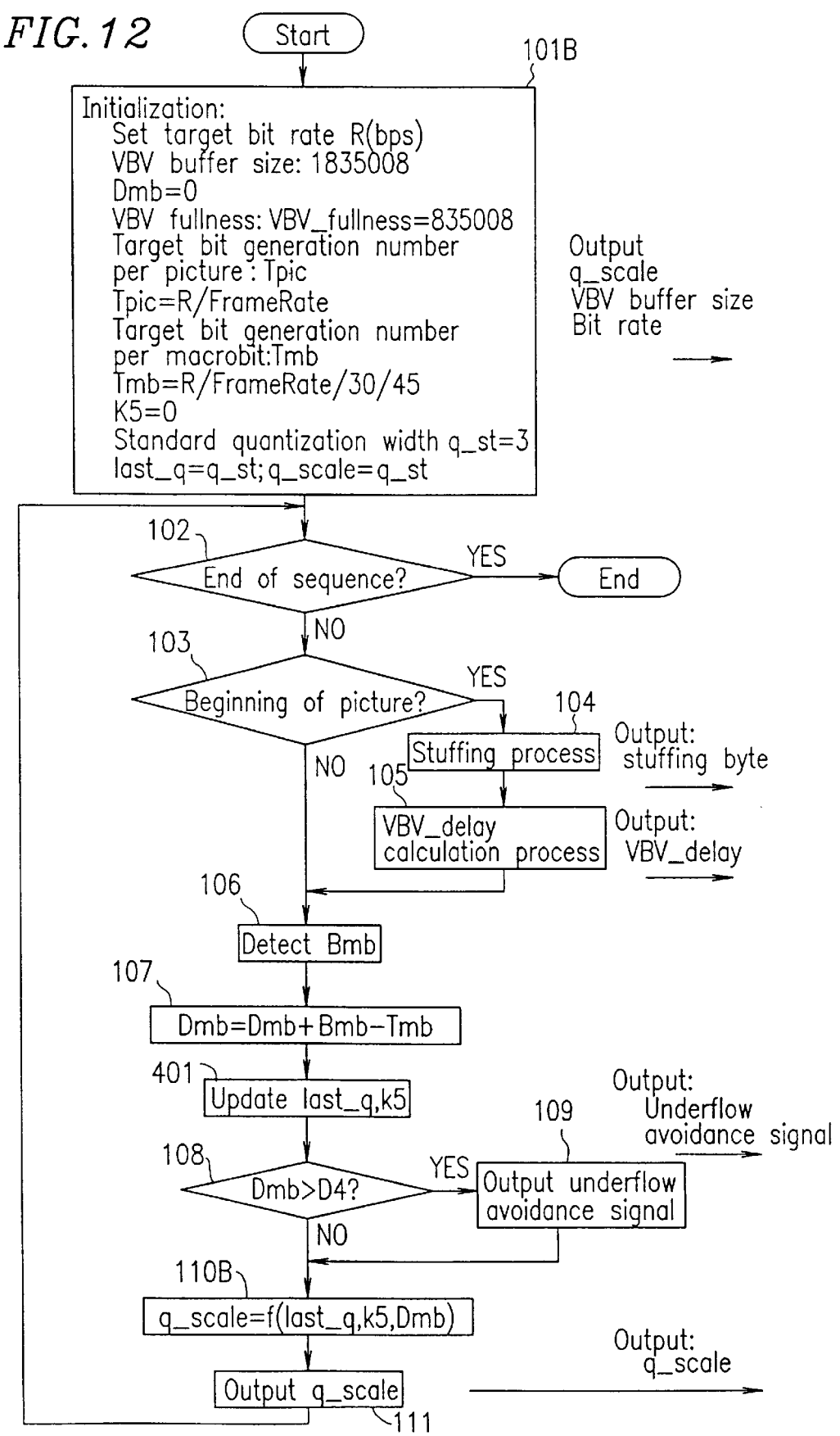
FIG. 12 is a flow chart showing an encoding process according to Example 3 of the present invention.

FIG. 12 is a flow chart showing an encoding process according to Example 3 of the present invention. The encoding process is performed by the encoding apparatus illustrated in FIGS. 1, 3 and 5.

The process shown in the flow chart of FIG. 12 is the same as that shown in the flow chart of FIG. 6 with steps 101 and 110 being substituted with steps 101B and 110B, respectively, and with another step 401 being added. The other steps 102 to 109 and 111 are the same as those shown in the flow chart of FIG. 6.

Therefore, the process shown in the flow chart of FIG. 12 is different from that shown in the flow chart of FIG. 6 in the initialization process at step 101B, the process for deriving the quantization width q_scale at step 110B, and the process for updating the coefficient K5 at step 401.

First, at step 101B, the control circuit 5 of the rate control section 3 sets the target bit rate R (bps) to a predetermined value, sets the size of the VBV buffer to 1835008 bits, sets the bit generation error Dmb to 0, and sets the fullness VBV_fullness to 935008 bits. Then, the control circuit 5 determines the target bit generation number Tpic for one picture by dividing the target bit rate R by the frame rate, and determines the target bit generation number Tmb for one macroblock by dividing the target bit rate R by the product of the frame rate and the number of macroblocks in one picture. Subsequently, the control circuit 5 sets the coefficient K5 to 0, the standard quantization width q_st to 3, and the previous quantization width last_q and the quantization width q_scale both to 3, as the standard quantization width q_st.

Step 101B is different from step 101 in FIG. 6 in that the fullness VBV_fullness is set to 935008 bits; the two new parameters are added (i.e., the coefficient K5 and the previous quantization width last_q); and the standard quantization width q_st is set to 3, which is a relatively small value.

Thereafter, the control circuit 5 repeats steps 102 to 107, 401, 108, 109, 110B and 111. In each iteration, the control circuit 5 determines the actual bit generation number Bmb for one macroblock (step 106); updates the bit generation error Dmb based on Expression (3) (step 107); updates the coefficient K5 and the previous quantization width last_q (step 401); updates the quantization width q_scale (step 110B) by performing a calculation based on the function f(last_q, K5, Dmb) after confirming that the bit generation error Dmb does not exceed the threshold value D4 (step 108, No); quantizes the transform coefficients obtained through the DCT transform in accordance with the quantization width q_scale (step 111); and performs a variable-length coding process for the quantization data so as to produce compressed/encoded image data.

Next, the process at step 401 will be described in accordance with the flow chart in FIG. 13.

First, the control circuit 5 updates the previous quantization width last_q to the quantization width q_scale used when encoding the previous macroblock (step 411), and determines whether the bit generation error Dmb>500000 is true (step 412). If the bit generation error Dmb>500000 is true (step 412, Yes), the control circuit 5 updates the coefficient K5 to the difference ($1 \leq difference \leq 4$) obtained by subtracting 6 from the previous quantization width last_q ($7 \leq last\_q \leq 10$) (step 414) after confirming that the previous quantization width last_q is in the range from 7 to 10 (i.e., $7 \leq last\_q \leq 10$) (step 413, Yes). Herein, if the previous quantization width last_q is not in the range from 7 to 10 (step 413, No), the coefficient K5 is not updated at step 414.

Then, if the bit generation error Dmb>500000 is not true (step 412, No), the control circuit 5 determines whether $0 \geq$ the bit generation error Dmb>−100000 and the coefficient K5≧4 are both true (step 415). If the condition is satisfied (step 415, Yes), the control circuit 5 updates the coefficient K5 to 3 (step 416). If the condition is not satisfied (step 415, No), the process proceeds to the next step 417.

At step 417, the control circuit 5 determines whether −100000≧ the bit generation error Dmb>−200000 and the coefficient K5>3 are both true (step 417). If the condition is satisfied (step 417, Yes), the control circuit 5 updates the coefficient K5 to 2 (step 418). If the condition is not satisfied (step 417, No), the process proceeds to the next step 419.

At step 419, the control circuit 5 determines whether −200000≧ the bit generation error Dmb>−300000 and the coefficient K5≧2 are both true (step 419). If the condition is satisfied (step 419, Yes), the control circuit 5 updates the coefficient K5 to 1 (step 420). If the condition is not satisfied (step 419, No), the process proceeds to the next step 421.

At step 421, the control circuit 5 determines whether the bit generation error Dmb<−300000 is true (step 421). If the condition is satisfied (step 421, Yes), the control circuit 5 updates the coefficient K5 to 0 (step 422). If the condition is not satisfied (step 421, No), the coefficient K5 is not updated.

Figure 13:
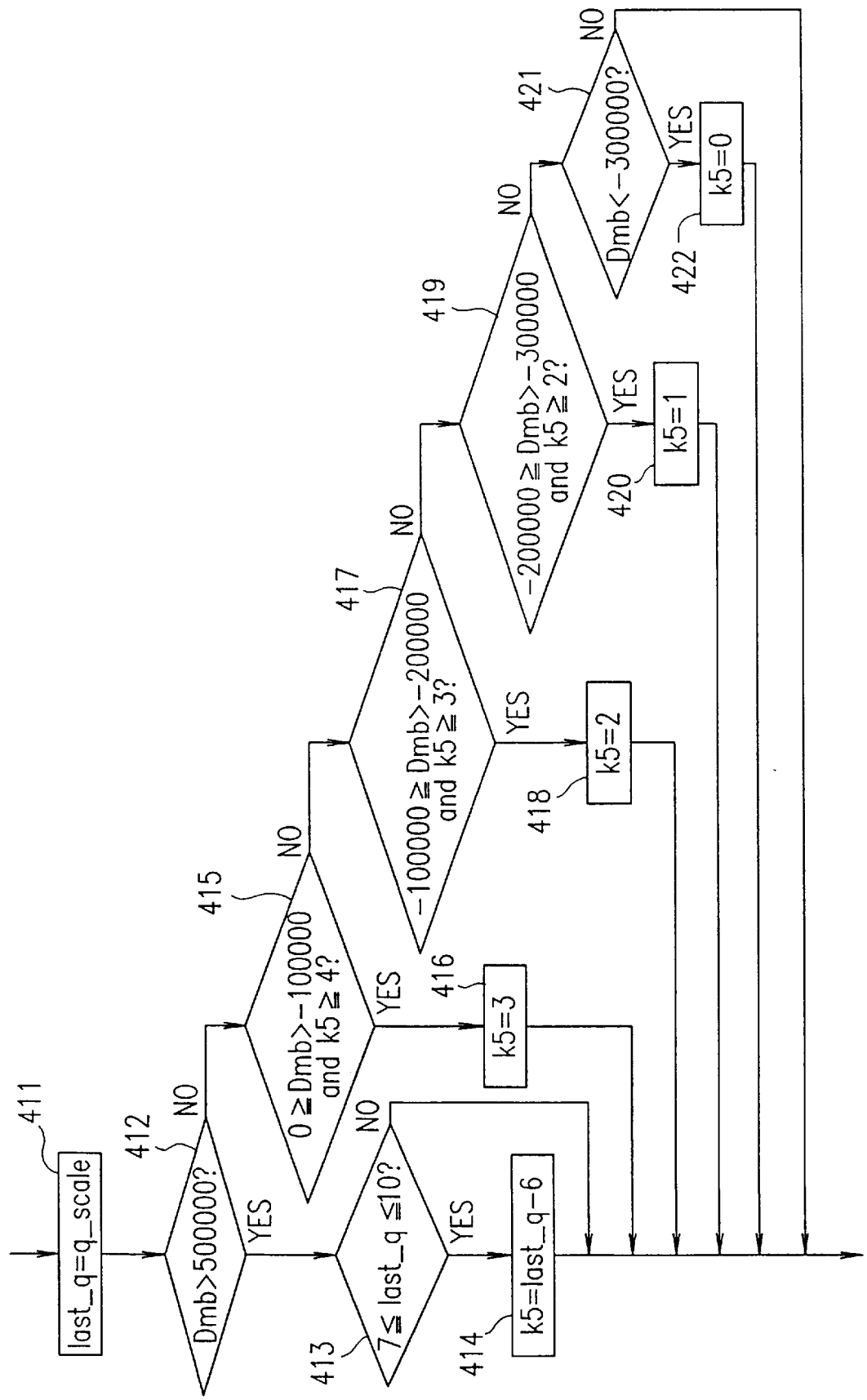
FIG. 13 is a flow chart showing a process at step 401 in the encoding process shown in FIG. 12.

In other words, in the process shown in the flow chart of FIG. 13, the previous quantization width last_q is updated to the quantization width q_scale used when encoding the previous macroblock. If the bit generation error Dmb is in none of the ranges at steps 412, 415, 417, 419 and 421 (i.e., if 500000≧ the bit generation error Dmb>0 is true), the coefficient K5 is not updated. Moreover, when the bit generation error Dmb>500000 is satisfied, the coefficient K5 is updated to the difference (1≦difference≦4) obtained by subtracting 6 from the previous quantization width last_q (7≦last_q≦10) provided that the previous quantization width last_q is within the range from 7 to 10 (i.e., 7≦last_q≦10). If the bit generation error Dmb is reduced to 0 or less thereafter, the coefficient K5 is gradually increased to 0 according to the degree of the reduction.

After updating the previous quantization width last_q and setting the coefficient K5 as described above, at step 110B in the flow chart of FIG. 12, a calculation based on the function f(last_q, K5, Dmb) is performed so as to update the quantization width q_scale.

Figure 14:
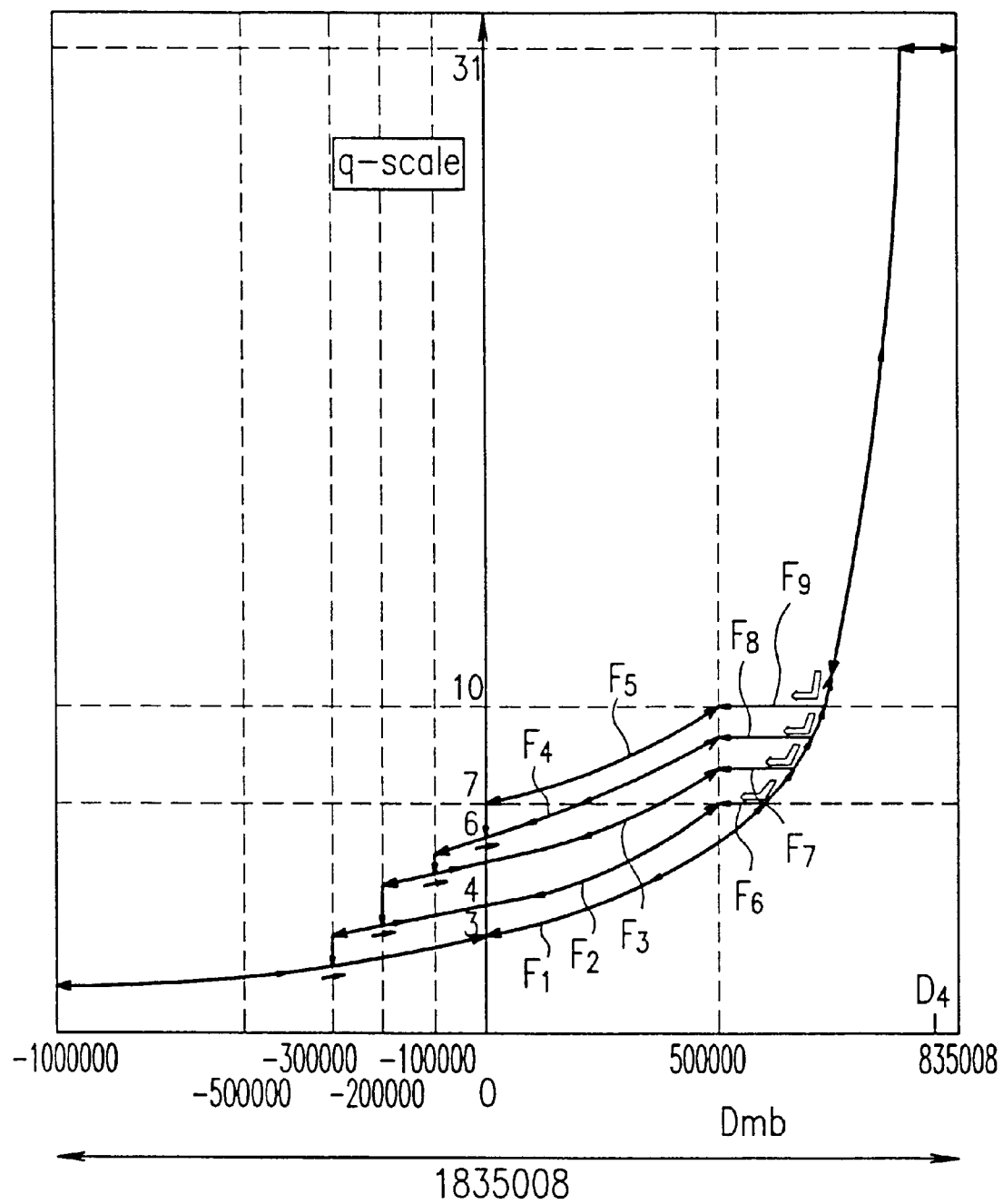
FIG. 14 is a graph showing a characteristic of a function f(last_q, K5, Dmb) for deriving a quantization width q_scale according to Example 3 of the present invention.

FIG. 14 shows a characteristic of the function f(last_q, K5, Dmb) for deriving the quantization width q_scale.

The characteristic of the function f(last_q, K5, Dmb) shown in FIG. 14 is represented by Expressions (21) to (28) below.

When Dmb<0:

$$f(last\_q, K5, Dmb)=1800000/(600000-Dmb)+K5 \quad (21)$$

When 0≦Dmb<500000:

$$f(last\_q, K5, Dmb)=3000000/(1000000-Dmb)+K5 \quad (22)$$

When Dmb≧500000 and 3000000/(1000000−Dmb)<7 and K5=1:

$$f(last\_q, K5, Dmb)=7 \quad (23)$$

When Dmb≧500000 and 3000000/(1000000−Dmb)<8 and K5=2:

$$f(last\_q, K5, Dmb)=8 \quad (24)$$

When Dmb≧500000 and 3000000/(1000000−Dmb)<9 and K5=3:

$$f(last\_q, K5, Dmb)=9 \quad (25)$$

When Dmb≧500000 and 3000000/(1000000−Dmb)<10 and K5=4:

$$f(last\_q, K5, Dmb)=10 \quad (26)$$

When none of the above conditions is satisfied and 900000≧Dmb≧500000:

$$f(last\_q, K5, Dmb)=3000000/(1000000-Dmb) \quad (27)$$

When none of the above conditions is satisfied and 900000>Dmb:

$$f(last\_q, K5, Dmb)=31 \quad (28)$$

Herein, the fractional portion of the quantization width q_scale derived from the function f(last_q, K5, Dmb) is rounded off.

After initializing the coefficient K5 to 0 as described above (step 101B), as long as 500000≧ the bit generation error Dmb>0 is true, since the coefficient K5 is not updated (step 401), the quantization width q_scale is derived from Expression (22) above, varies in accordance with the characteristic F1 in the graph of FIG. 14, and coincides with the standard quantization width q_st=3 when the bit generation error Dmb=0 is true.

Thereafter, when the bit generation error Dmb>500000 becomes true (step 412, Yes) while the previous quantization width last_q=10 becomes true (step 413), the coefficient K5 is updated to 4 (step 414).

Next, when the quantization width q_scale is adjusted, and the bit generation error Dmb is reduced, the quantization width q_scale is derived from Expression (26) above and varies in accordance with the characteristic F9 in the graph of FIG. 14. Moreover, when 500000≧ the bit generation error Dmb>0 becomes true, the quantization width q_scale is derived from Expression (22) above, but varies in accordance with the characteristic F5 in the graph of FIG. 14 because the coefficient K5 is updated to 4.

Then, when the bit generation error Dmb is reduced, and if it is determined that 0≧ the bit generation error Dmb>−100000 and the coefficient K5≧4 are both true (step 415, Yes), since the coefficient K5 is updated to 3 (step 416), the quantization width q_scale is derived from Expression (22) above, and varies in accordance with the characteristic F4 in the graph of FIG. 14.

Thereafter, when 500000≧ the bit generation error Dmb>0 is again true, the quantization width q_scale varies in accordance with the characteristic F4 in the graph of FIG. 14. Moreover, when the bit generation error Dmb is further reduced, and if it is determined that the bit generation error Dmb<−300000 is true (step 421, Yes), the quantization width q_scale is derived from Expression (22) above and varies in accordance with the characteristic F1 in the graph of FIG. 14 because the coefficient K5 is updated to 0 (step 422).

Similarly, when the bit generation error Dmb>500000 is true, the coefficient K5 is updated to be increased provided that the previous quantization width last_q is within the range from 7 to 10 (i.e., 7≦last_q≦10). Thereafter, when 500000≧ the bit generation error Dmb>0 is true, one of the characteristics F2 to F5 is selected according to the value of the coefficient K5, and the coefficient K5 is gradually reduced as the bit generation error Dmb decreases, thereby returning to the characteristic F1.

In other words, in the process shown in the flow chart of FIG. 12, a characteristic which defines a hysteresis loop is employed as the characteristic of the quantization width q_scale. Therefore, even when the bit generation number consumed for the encoding process increases, and the bit generation error Dmb accordingly increases, due to an increased degree of difficulty of encoding a picture, the above-described characteristic may still be maintained by increasing the quantization width q_scale, whereby it is possible to stabilize the quality of the reproduced image.

Moreover, in the case where the coefficient K5 is increased due to an excessively increased degree of difficulty of encoding, and the degree of difficulty of encoding is then reduced because of a scene change, or the like, the quantization width q_scale is rapidly reduced in the region where the bit generation error Dmb<0. However, since a rate of change of the quantization width q_scale is small when the bit generation error Dmb increases subsequently, the image quality is improved and then the improved image quality is stably maintained.

Thus, the quantization width is set to a relatively small value when the degree of difficulty of encoding is low, while it is set to a relatively large value when the degree of difficulty of encoding is high, thereby stably maintaining the quality of the reproduced image in either case. Therefore, it is not necessary to alter the function for deriving the quantization width for each of the target bit rates, whereby it is possible to perform an encoding process so as to provide a stable image quality for any degree of difficulty of encoding.

In Example 3, the function which derives the characteristic curve as represented by the above expressions is employed as a function for deriving the quantization width. However, the characteristic curve may be approximated to a straight line as long as the characteristic defines a hysteresis loop. Moreover, although the quantization width and the bit generation error are both used as conditions for a hysteresis characteristic in this example, using either one of them is also applicable since one can be derived from the other.

As is apparent from the above description, according to the present invention, the bit generation error is determined as the difference between the actual bit generation number and the target bit generation number so as to determine the quantization width which corresponds to the bit generation error. Moreover, a characteristic is set such that, in a predetermined range of the bit generation error, the quantization width varies slightly with respect to a variation of the bit generation error so as to determine the quantization width with respect to the bit generation error based on the characteristic. Therefore, when the bit generation error varies in the predetermined range of the bit generation error, the quantization width does not vary by a large amount, and a suitable bit generation number is assigned for each of the I, P and B pictures in a GOP, thereby providing a stable image quality for a reproduced images for each of the I, P and B pictures in the GOP. Furthermore, for one picture, as long as the bit generation error varies in the predetermined range of the bit generation error, an appropriate quantization width is set, whereby it is possible to assign a suitable bit generation number for each of the macroblocks according to the degree of difficulty of encoding the macroblock.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An image compression/encoding apparatus for determining a quantization width by which a video signal is encoded so as to encode the video signal based on the quantization width, the apparatus comprising control means for determining an actual bit generation number which has been consumed for encoding the video signal, determining a target bit generation number in accordance with a target bit rate, determining a bit generation error as a difference between the actual bit generation number and the target bit generation number, determining a quantization width with respect to the bit generation error, setting a characteristic in a predetermined range of the bit generation error where the quantization width varies slightly with respect to the bit generation error, and determining the quantization width with respect to the bit generation error based on the characteristic, wherein the characteristic of the variation of the quantization width with respect to the variation of the bit generation error defines a hysteresis loop in and in a vicinity of a predetermined range of the bit generation error.

2. An image compression/encoding apparatus according to claim 1, wherein:

a standard quantization width is predetermined; and the control means determines a ratio between a value obtained by subtracting from the target bit rate a value which corresponds to the bit generation error and the target bit rate, multiplies the ratio with the standard quantization width to give a product, and determines a quantization width, by which a video signal is encoded, based on the product.

3. An image compression/encoding apparatus according to claim 1, wherein the control means determines a standard quantization width based on the target bit rate, sets a characteristic in a predetermined range of the bit generation error where the quantization width varies slightly with respect to a variation of the bit generation error in the vicinity of the standard quantization width, and determines the quantization width with respect to the bit generation error based on the characteristic.

4. An image compression/encoding apparatus according to claim 1, wherein:

when a virtual buffer is virtually provided for sequentially receiving image data obtained by encoding a video signal and sequentially outputting the image data, a fullness of the virtual buffer corresponds to the bit generation error; and when the fullness of the virtual buffer approaches zero, the quantization width rapidly approaches a maximum value thereof while the quantization width varies continuously so as to be successive from the characteristic where the quantization width varies slightly with respect to the variation of the bit generation error.

5. An image compression/encoding apparatus according to claim 1, wherein:

the apparatus is in conformity with the MPEG standard and encodes a video signal by macroblocks based on the quantization width; and the control means determines a quantization width with respect to the bit generation error for each macroblock.

6. An image compression/encoding apparatus according to claim 1, wherein the control means comprises a predefined model curve defining a desired relationship between bit generation error and quantization width, the control means determines the quantization width based on the predefined model curve and the location of the bit generation error along the curve, and the variation of the quantization width with respect to the variation of bit generation error is reduced in the vicinity of average quantization width determined by the target bit rate within the predefined model curve.

7. An image compression/encoding apparatus for determining a quantization width by which a video signal is encoded so as to encode the video signal based on the quantization width, the apparatus comprising control means for determining an actual bit generation number which has been consumed for encoding the video signal, determining a target bit generation number in accordance with a target bit rate, determining a bit generation error as a difference between the actual bit generation number and the target bit generation number, determining a quantization width with respect to the bit generation error, setting a characteristic in a predetermined range of the bit generation error where the quantization width varies slightly with respect to the bit generation error, and determining the quantization width with respect to the bit generation error based on the characteristic, wherein:

a plurality of ranges of the bit generation error are predetermined, with a characteristic which indicates a variation of the quantization width with respect to the variation of the bit generation error being set for each of the ranges; and the control means selects one of the ranges in which a bit generation error exists so as to determine the quantization width with respect to the bit generation error based on the characteristic of the selected range.

8. An image compression/encoding method for determining a quantization width by which a video signal is encoded so as to encode the video signal based on the quantization width, the method comprising the steps of:

determining an actual bit generation number which has been consumed for encoding the video signal;

determining a target bit generation number in accordance with a target bit rate;

determining a bit generation error as a difference between the actual bit generation number and the target bit generation number;

determining a quantization width with respect to the bit generation error;

setting a characteristic in a predetermined range of the bit generation error where the quantization width varies slightly with respect to the bit generation error; and determining the quantization width with respect to the bit generation error based on the characteristic, wherein the characteristic of the variation of the quantization width with respect to the variation of the bit generation error defines a hysteresis loop in and in a vicinity of a predetermined range of the bit generation error.

9. An image compression/encoding method according to claim 8, wherein:

a standard quantization width is predetermined;

a ratio between a value obtained by subtracting from the target bit rate a value which corresponds to the bit generation error and the target bit rate is determined;

the ratio is multiplied with the standard quantization width to give a product; and a quantization width, by which a video signal is encoded, is determined based on the product.

10. An image compression/encoding method according to claim 8, wherein:

a standard quantization width is determined based on the target bit rate;

a characteristic is set in a predetermined range of the bit generation error where the quantization width varies slightly with respect to a variation of the bit generation error in the vicinity of the standard quantization width; and the quantization width with respect to the bit generation error is determined based on the characteristic.

11. An image compression/encoding method according to claim 8, wherein:

when a virtual buffer is virtually provided for sequentially receiving image data obtained by encoding a video signal and sequentially outputting the image data, a fullness of the virtual buffer corresponds to the bit generation error; and when the fullness of the virtual buffer approaches zero, the quantization width rapidly approaches a maximum value thereof while the quantization width varies continuously so as to be successive from the characteristic where the quantization width varies slightly with respect to the variation of the bit generation error.

12. An image compression/encoding method according to claim 8, wherein:

the method is in conformity with the MPEG standard and encodes a video signal by macroblocks based on the quantization width; and a quantization width with respect to the bit generation error is determined for each macroblock.

13. An image compression/encoding method according to claim 8, wherein based on a predefined model curve defining a desired relationship between bit generation error and quantization width, determining the quantization width based on the predefined model curve and the location of the bit generation error along the curve, and reducing the variation of the quantization width with respect to the variation of bit generation error in the vicinity of average quantization width determined by the target bit rate within the predefined model curve.

14. An image compression/encoding method for determining a quantization width by which a video signal is encoded so as to encode the video signal based on the quantization width, the method comprising the steps of:

determining an actual bit generation number which has been consumed for encoding the video signal;

determining a target bit generation number in accordance with a target bit rate;

determining a bit generation error as a difference between the actual bit generation number and the target bit generation number;

determining a quantization width with respect to the bit generation error;

setting a characteristic in a predetermined range of the bit generation error where the quantization width varies slightly with respect to the bit generation error; and determining the quantization width with respect to the bit generation error based on the characteristic, wherein:

a plurality of ranges of the bit generation error are predetermined;

a characteristic which indicates a variation of the quantization width with respect to the variation of the bit generation error is set for each of the ranges; and one of the ranges is selected in which a bit generation error exists so as to determine the quantization width with respect to the bit generation error based on the characteristic of the selected range.

* * * * *